(12) United States Patent
Greene et al.

(10) Patent No.: US 7,167,588 B2
(45) Date of Patent: Jan. 23, 2007

(54) DOCUMENT IMAGE DECODING SYSTEMS AND METHODS USING MODIFIED STACK ALGORITHM

(75) Inventors: Daniel H. Greene, Sunnyvale, CA (US); Justin Romberg, Houston, TX (US); Ashok C. Popat, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 638 days.

(21) Appl. No.: 10/215,041

(22) Filed: Aug. 9, 2002

(65) Prior Publication Data

US 2004/0028279 A1 Feb. 12, 2004

(51) Int. Cl.
*G06K 9/72* (2006.01)
(52) U.S. Cl. .................................... 382/229
(58) Field of Classification Search ................. 382/229
See application file for complete search history.

(56) References Cited

U.S. PATENT DOCUMENTS

| 5,392,363 | A | * | 2/1995 | Fujisaki et al. ............. 382/187 |
| 6,356,911 | B1 | * | 3/2002 | Shibuya ....................... 707/101 |
| 2004/0028278 | A1 | * | 2/2004 | Greene et al. .............. 382/228 |

OTHER PUBLICATIONS

Paul, Douglas. "An Efficient A* Stack Decoder Algorithm for Continuous Speech Recognition with a Stochastic Language Model," Speech and Signal Processing, pp. 25-28, 1992.*
Tomita, Masaru. "An Efficient Augments-Context-Free Parsing Algorithm," Computational Lingusitics, vol. 13, Nos. 1-2, Jan.-Jun. 1987.*
Achtmann, Kai, Drosdek, Sabine, Rupprecht, Warner., "An Implementation of the Generalized Stack Algorithm Using a Partially Sorting Algorithm," IEEE 1994.*
Basaran, Bulent, Rutenbar, Rob A., "An O(n) Algorithm for Transistor Stacking with Performance Constraints," ACM 1996.*
Ma, Jeff Z., Deng, Li. "A path-stack algorithm for optimizing dynamic regimes in a statistical hidden dynamic model of speech," Academic Press, 2000.*
K. Popat, D. Greene, J. Romberg, and D. Bloomberg, "Adding Linguistic Constraints to Document Image Decoding: Comparing the Iterated Complete Path and Stack Algorithms," In Proceedings of IS&T/SPIE Electronic Imaging 2001: Document Recognition and Retrieval VIII, Jan. 2001.
K. Popat, D. Bloomberg, and D. Greene, "Adding Linguistic Constraints to Document Image Decoding," In Proceedings of The 4th IAPR Workshop on Document Analysis Systems (DAS 2000), Dec. 2000.
Popat, K.; Greene, D.H.; Poo, T. "Adaptive Stack Algorithm in Document Image Decoding," International Conference On Pattern Recognition; Aug. 11-15, 2002; Quebec City; Canada.
Jelinek, Frederick, "Statistical Methods for Speech Recognition," MIT Press, 1998.
Johannesson, Rolf, and Zigangirov, Kamil Sh., "Fundamentals of Convolutional Coding," IEEE Press, 1998.

* cited by examiner

*Primary Examiner*—Joseph Mancuso
*Assistant Examiner*—Jonathan Schaffer
(74) *Attorney, Agent, or Firm*—Oliff & Berridge, PLC

(57) ABSTRACT

Methods and systems for document image decoding incorporating a Stack algorithm improve document image decoding. The application of the Stack algorithm is iterated to improve decoding. A provisional weight is determined for a partial path to reduce template matching. In addition, semantically equivalent hypotheses are identified to reduce redundant hypotheses.

27 Claims, 12 Drawing Sheets

DOCUMENT IMAGE DECODING SYSTEMS AND METHODS USING MODIFIED STACK ALGORITHM

BACKGROUND OF THE INVENTION

1. Field of Invention

This invention relates to methods and systems for document image decoding.

2. Description of Related Art

Document image decoding (DID) is a method for recognizing text contained within document images that is based on a communications systems view of the document composition, printing, degradation, and scanning processes. Among the advantages of document image decoding are high recognition accuracy in situations where extensive customization is allowable, the ability to recognize some higher-level structure along with the text, and the ability to extend and improve a system within a consistent probabilistic framework.

In the document image decoding framework, document images are regarded as having been produced by transitioning through a Markov source, which is a probabilistic finite-state machine. The source begins in a special start state and terminates in a special stop state. Each transition within the source inputs a portion of the image, e.g., a bitmap, on the page at a current cursor location, outputs a recognized character, then advances that location by a two-dimensional vector displacement in preparation for recognizing the next character. The transitions are selected based on the degree of correspondence between the input image portion and a character template associated with the output character. The set of character templates includes white space of various kinds.

Formally, each transition in the source is assigned a four-tuple consisting of a character template, a two-dimensional displacement by which to advance a cursor, the prior probability of following that transition, and a string label comprising, for example, the recognized character. It should be appreciated that, conventionally, the amount of information encapsulated in the prior probability is quite limited. For instance, the prior probability does not take into account what previous transitions might have occurred on the same path through the Markov source.

Every complete path through the source defines a document image and an associated transcription. In general, the image is the union of the bitmaps imaged on each transition. In general, the transcription is the concatenation of the associated string labels. It should be appreciated that more than one complete path through the source may give rise to the same image and/or the same transcription.

After the document image has been formed, the document image is assumed to have been subjected to some form of random corruption process prior to the recognition process, which causes some uncertainty in the recognition process. In general, recognition proceeds by finding a complete path through the hypothesized Markov source that "best" explains the observed image. Specifically, recognizing the document image comprises seeking a complete path through the source that is most probable considering the entire document image as evidence. In general, the probability for the each complete path is determined on the basis of the prior probabilities of the transitions, the likelihood of the associated imaged templates, and the random corruption process. Because multiple paths can correspond to the same transcription, choosing the most probable complete path is not the same as choosing the most probable transcription.

The probability of a transcription is properly determined by summing the probabilities of all of the complete paths that are consistent with that transcription. Nevertheless, experience has shown that choosing a message with the greatest complete-path probability is usually a good approximation to choosing the message with the highest posterior probability. This is known as the Viterbi approximation to the maximum a posteriori probability (MAP) decision rule.

SUMMARY OF THE INVENTION

When a language model is incorporated into document image decoding (DID), the decoding space becomes so large that it is difficult to perform decoding with methods such as the Viterbi algorithm. Also, a document image decoding model may include a blank, single-pixel width character, which is called "thin space". This thin space makes it difficult to incorporate a language model into document image decoding. Furthermore, when a language model is incorporated into document image decoding, template matching becomes very expensive.

Accordingly, systems and methods that reduce difficulties associated with incorporating language models into document image decoding would be desirable.

The Stack algorithm provides a means of directly comparing paths of differing lengths, so that, at each step, the most promising path can be extended. The Stack algorithm uses a priority queue to determine the most promising path according to a measure of the overall potential of each partial path ending in a high-scoring full path.

This invention provides systems and methods that complement a modified Stack algorithm.

This invention separately provides systems and methods that implement a modified Stack algorithm that allows the Stack algorithm to be used with paths having similar weights.

This invention separately provides systems and methods that implement a modified Stack algorithm that allows the Stack algorithm to be used with paths having different lengths.

This invention separately provides systems and methods that implement a modified Stack algorithm that is usable with document image decoding.

This invention provides methods and systems that allow a modified Stack algorithm to be used in document image decoding.

This invention provides methods and systems that allow a modified Stack graph to be explored.

This invention further provides systems and methods that identify a desirable path in document image decoding based on the explored modified Stack graph.

This invention additionally provides methods and systems that allow a priority table to be used to identify the desirable path.

This invention also provides methods and systems that allow only a part of a Stack graph to be explored.

This invention further provides systems and methods that identify a desirable path based on the explored part of the Stack graph.

This invention additionally provides methods and systems that allow a possible extension of a path to be examined.

This invention further provides systems and methods that identify a desirable path based on the examined possible extension.

This invention also provides methods and systems that allow a weight of a path to be determined.

This invention further provides systems and methods that identify a priority of the path in a modified Stack algorithm based on the determined weight.

This invention separately provides methods and systems that allow a template matching component weight to be determined.

This invention separately provides methods and systems that allow a language model component weight in a modified Stack algorithm to be determined.

This invention further provides systems and methods that allow a weight of a partial path to be determined.

This invention separately provides methods and systems that allow the weight of the partial path to be determined using a parameterization between a template matching and a language model component weight.

This invention separately provides methods and systems that allow the number of semantically equivalent hypotheses to be reduced when using the modified Stack algorithm.

This invention separately provides methods and systems that allow determining whether a partial path is semantically equivalent to another partial path.

This invention separately provides methods and systems that allow semantically equivalent hypotheses to be identified.

This invention further provides systems and methods that allow hypotheses to be reduced based on the identified semantically equivalent hypotheses.

This invention separately provides methods and systems that allow updating semantically equivalent hypotheses when using a modified Stack algorithm.

This invention further provides systems and methods that update the semantically equivalent hypotheses by using a re-do queue.

Various exemplary embodiments of the methods and systems according to this invention allow a partial path to be identified as being semantically equivalent to another partial path. In various exemplary embodiments, a partial path on a priority queue is discarded if another path has a better weight when that the path is semantically equivalent to that other path. In various exemplary embodiments, identifying semantically equivalent paths reduces the extent of path exploration.

These and other features and advantages of this invention are described in, or are apparent from, the following detailed description of various exemplary embodiments of the methods and systems according to this invention.

BRIEF DESCRIPTION OF THE DRAWINGS

Various exemplary embodiments of the methods and systems of this invention will be described in detail, with reference to the following figures, wherein.

DETAILED DESCRIPTION OF EXEMPLARY EMBODIMENTS

Document image decoding (DID) takes a communication systems approach to optical character recognition (OCR). When a language model is incorporated, a document image decoding process considers both a template matching and a linguistic likelihood when decoding a character in a received document image.

Regarding the linguistic likelihood, an original message $N=c_1, c_2, C_3, \ldots$, with statistical properties given by language model L, is "transmitted" on a channel. In a $d^{th}$-order language model $L_d$, each character is given a probability based on a context of size d. For example, in various exemplary embodiments, a current character is given a probability based on a context of the d characters appearing immediately prior to the current character.

Figure 1:
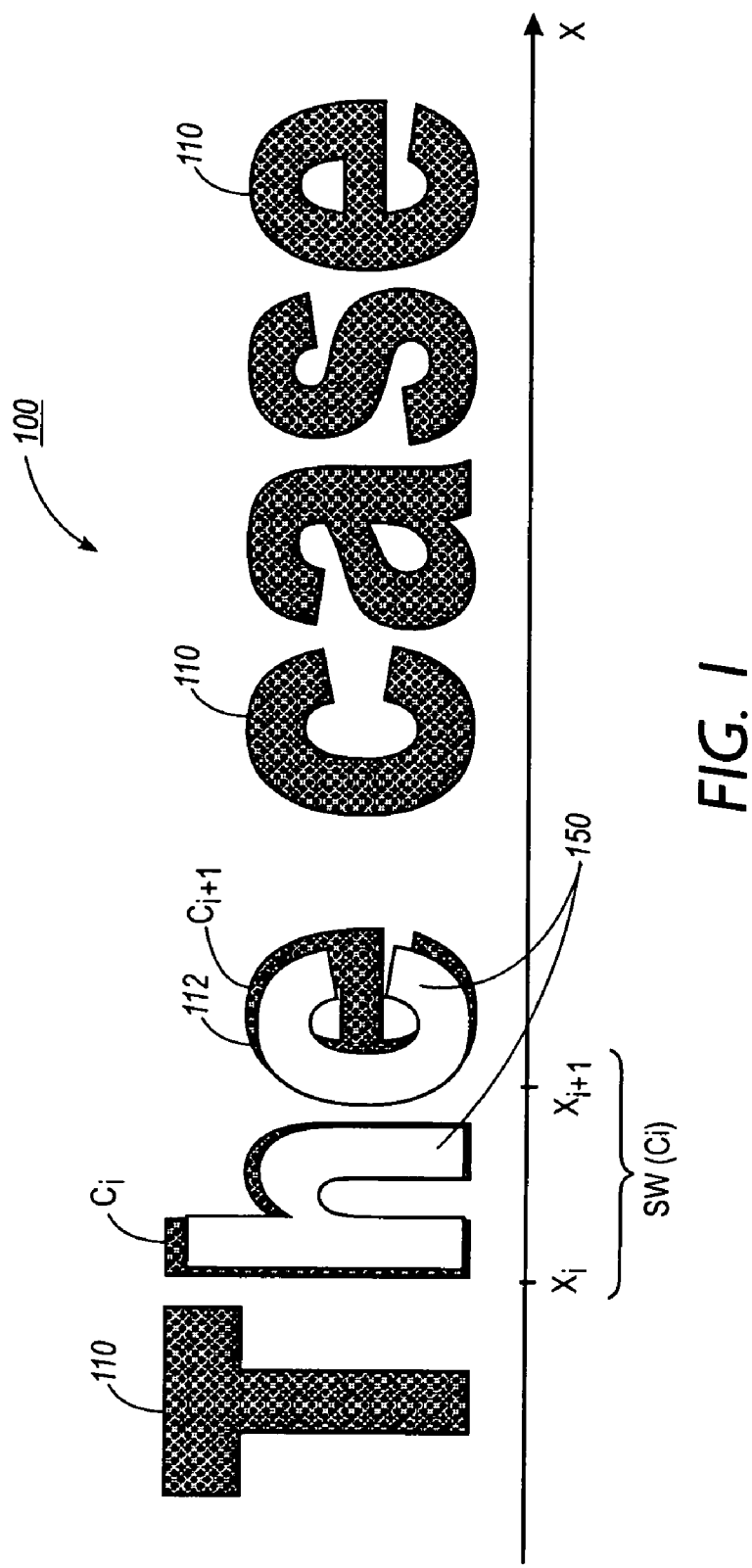
FIG. 1 illustrates one exemplary embodiment of a decoding framework according to this invention.

FIG. 1 illustrates one exemplary embodiment of a document image decoding framework when applied to a text fragment 100. As shown in FIG. 1, a document image of the text fragment 100 comprises a plurality of characters 110, i.e., the black characters 110.

For ease of discussion, the text fragment 100 shown in FIG. 1 is considered to be a one-dimensional text line. The text line begins at the left-most point of the text fragment 100 and ends at the right-most point of the text fragment 100, with the size of the text line increasing in the increasing direction of an x-coordinate.

Each of the plurality of characters 110 in FIG. 1 is labeled $c_i$ for discussion and is located at a corresponding x-coordinate value $x_i$. Here, i=1, 2, 3, . . . , is an index of the characters 110 of the text fragment 100.

In the exemplary embodiment of a document image decoding framework shown in FIG. 1, a language model $L_d$ may find that the third character is more likely to be the letter "e" than the letter "c," because, in view of the one or more characters prior to the third character, the string "T-h-e" is linguistically more probable than the string "T-h-c."

In various exemplary embodiments of the methods and systems according to this invention, a probability $P(c_i)$ for a next character $c_i$ to appear at a position i of a message $N=c_1, c_2, c_3, \ldots, c_1, \ldots$, using a $d^{th}$-order language model $L_d$, is expressed as:

$$P(c_i | c_{i-d+1}, c_{1-d+2}, \ldots, c_{i-1}), \quad (1)$$

where:
  $c_i$ is the next character; and
  $c_{1-d+1}$, etc. are the d previous characters.

In various exemplary embodiments of the methods and systems according to this invention, the context size d of the $d^{th}$-order language model $L_d$ is fixed. In various other exemplary embodiment of the methods and systems according to this invention, the context size d of the $d^{th}$-order language model $L_d$ is allowed to vary.

In various exemplary embodiments of the methods and systems according to this invention, a rendering model R is used to account for the character positioning process in a document. A degradation model D is used to account for image distortions that may occur during printing, copying, and/or scanning of a document containing the text fragment to be recognized. The rendering model R and the degradation model D establish how a character in a source text string $N=c_1, c_2, c_3, \ldots$ appears in a received document image Z after being rendered and degraded. Accordingly, a document image decoding process determines a most likely rendering process and a most likely degradation process that define a most likely source $N'=c_1, c_2, c_3, \ldots$ to be decoded from a received image Z.

In the rendering model R, it is assumed that a character $c_i$, located at a position (x, y), causes a character template from a font f to be placed in an ideal image Q. Such a model may be expressed as:

$$R(c_i, f, x, y, Q). \quad (2)$$

In various exemplary embodiments of the methods and systems according to this invention, for one line of text with a fixed baseline and a single font typeface, the rendering model R shown in Eq. (2) is simplified as:

$$R(c_i, x, Q). \quad (3)$$

According to many exemplary rendering models R, there is a character dependent spacing between characters. In the example shown in FIG. 1, after rendering a character $c_i$ at an x-coordinate position $x_1$ by $R(c_i, x_i, Q)$, the next character $c_{i+1}$ will be rendered at an next x-coordinate $x_{i+1}$ which is determined as:

$$x_{i+1}=x_i+w(c_i),$$

where $w(c_i)$ is a set-width of the preceding character $c_1$.

In many exemplary rendering models R, the size of the spacing $w(c_i)$ depends on the font. Furthermore, in many exemplary fonts, the size of the spacing $w(c_1)$ may vary from character to character. On the other hand, accordingly to the degradation model, the ideal image Q may be degraded by printing, scanning, and/or use of the document, to form the received image Z that is to be decoded.

In various exemplary embodiments of the methods and systems according to this invention, a matching function $M(c_i, x, Z)$ is used to determine the likelihood that the character $c_i$ was rendered at a position $x_i$ by $R(c_i, x_i, Q)$ and then degraded by the degradation function or model $D(Q \to Z)$ to form the received document image Z. This determination is based on a matching the degraded received document image Z with a set of templates.

In the exemplary text fragment 100 shown in FIG. 1, the third character 112 may be compared with a plurality of templates 150 to identify that the third character 112 is more likely to match with the template for the character "c" or the template for the character "e" than with the templates of any other characters. Furthermore, based on the $d^{th}$-order language model $L_d$, the third character 112 may be identified to more likely match with the template for the character "e" than with the template for the character "c".

In various embodiments of the methods and systems according to this invention, the matching function $M(c_i, x, Z)$ includes a bit flip model. In the bit flip model, there is a small probability that a black pixel becomes white, and another small probability that a white pixel becomes black. In various exemplary embodiment of the methods and systems according to this invention, the matching function $M(c_i, x, Z)$ includes a symmetric bit flip model, where the probability that a black pixel becomes white is equal to the probability that a white pixel becomes black. In various other exemplary embodiment of the methods and systems according to this invention, the matching function $M(c_i, x, Z)$ includes a full gray-scale model.

For a received document image Z, such as a line of text, there may exist a plurality of hypotheses H regarding how an original text M is rendered into the ideal image Q and then degraded to the received document image Z. Each hypothesis H has a probability. A hypothesis H that a character $c_i$ appears at a position $x_i$ can be expressed as $H(c_i, x_1)$. The probability of $H(c_i, x_i)$ that a specific character $c_i$ appears at that position $x_i$ in the received document image Z is the product of the probability of matching the specific character $c_i$ to an appropriate template $T(c_i, x_i, Z)$ and the probability $P(c_{i-d+1}, c_{i-d+2}, \ldots, c_{i-1})$ that the specific character $c_i$ will appear next, given the preceding d characters based on a language context from the $d^{th}$-order language model $L_d$. Thus, the probability $P(c_i, x_i)$ of the hypothesis $H(c_i, x_i)$ is:

$$P(c_i, x_i)=M(c_i, x_i, Z)*P(c_i|c_{i-d+1}, c_{i-d+2}, \ldots, c_{i-1}). \quad (4)$$

Furthermore, a hypothesis H' that an entire text line of the degraded image Z comprises a string of character $c_1$ at position $x_i$, character $c_2$ at position $x_2$, character $c_3$ at position $x_3$, and, in general, character $c_i$ at position $x_i$, can be expressed as:

$$H'=(c_1, x_1), (c_2, x_2), (c_3, x_3), \ldots, (c_i, x_i), \quad (5)$$

Accordingly, the probability of the hypothesis H' expressed in Eq. (5) is the product of the probabilities of each $(c_i, x_i)$. Thus, the probability of H' is:

$$P(H') = \left[\prod_i M(c_i, x_i, Z)\right] * \left[\prod_i P(c_i | c_{i-d+1}, c_{i-d+2}, \ldots, c_{i-1})\right]. \quad (6)$$

Thus, the log probability of the hypothesis H' is:

$$\log P(H') = \sum_i \log M(c_i, x_1, Z) + \sum_i \log P(c_i | c_{i-d+1}, c_{i-d+2}, \ldots, c_{i-1}). \quad (7)$$

In particular, Eq. (7) contains a template matching component TM(i):

$$TM(i)=\log M(c_i, x_i, Z), \quad (8)$$

and a language model component LM(i):

$$LM(i)=\log P(c_i|c_{i-d+1}, c_{i-d+2}, \ldots, c_{i-1}). \quad (9)$$

In various embodiments of the methods and systems according to this invention, the requirement that the x-coordinate position of the next character $c_{i+1}$, be defined solely by the set-width $w(c_i)$ of the preceding character, that is, that $x_{i+1}=x_i+w(c_1)$, is relaxed by adding zero or more special "thin space" characters t between the message characters $c_i$ to achieve a desired positioning of the message characters $c_i$. Each thin space t has a set-width of, for example, one pixel.

A hypothesis H" that includes one or more thin spaces t can be expressed as:

$$H''=(c_1, x_1), (t_1), (c_2, x_2), (t_2), (c_3, x_3), \ldots, \quad (10)$$

where $t_i$ is the number of thin spaces between two adjacent message characters $c_i$ and $c_{i+1}$.

The hypothesis H" has a log probability given by Eq. (7), with additional template matching terms for the thin space characters. That is, the log probability of the hypothesis H" can be expressed as:

$$\log P(H'') = \sum_i \log M(c_i, x_i, Z) + \sum_i \log P(c_i | c_{i-d+1}, c_{i-d+2}, \ldots, c_{i-1}) + \sum_i \log M(t_i, x_i, Z). \quad (11)$$

In various exemplary embodiments of the methods and systems according to this invention, the log $M(t_i, x_i, Z)$ for each thin space character t is defined to be nearly equivalent to a comparable fraction of the log of the match score for a full space in the same location. However, these additional matching terms are defined as slightly smaller than that of a full space, so that the matching function $M(c_i, x, Z)$ will not replace an ordinary space character with one or more thin space characters t.

Thin space characters t generally introduce multiple hypotheses $H_t$ for the same message character string $c_1, c_2, c_3, \ldots$. In this case, each of the multiple hypotheses $H_t$ will differ only in the different numbers of thin space characters t. This often results in duplicate or semantically equivalent hypotheses $H_t$, increasing the cost associated with document image decoding.

In various exemplary embodiments of the methods and systems according to this invention, a most likely hypothesis $H_L$ is determined and used for a decoding solution. In such exemplary embodiments, different hypotheses H are compared to determine whether the different hypotheses are semantically equivalent. In various exemplary embodiments, a hash table can be used to make such determinations. When two hypotheses $H_i$ and $H_j$ are semantically equivalent, the hypothesis $H_i$ with a greater promise to lead to a solution is kept and the other hypothesis $H_j$ is discarded. Accordingly, the number of duplicate or semantically equivalent hypotheses H is reduced, as will be discussed in greater detail below.

The thin space characters t may also allow templates T to separate, while the rendering model R may allow the templates T to overlap. Overlapping templates affect the way template matching is normalized for the whole line, and this may cause difficulties when a language model is incorporated. In general, due to imprecision in modeling, some flexibility is required in combining models. In various exemplary embodiments of the methods and systems according to this invention, a simple parameterization is employed to overcome these difficulties. For example, in many exemplary embodiments, the log probability defined in Eq. 11 is parameterized as:

$$\text{Log } P(H'') = \sum_i [TM(i) + \lambda LM(i)], \quad (12)$$

where $\lambda$ is a parameter.

In various exemplary embodiments of the methods and systems according to this invention, the parameter $\lambda$ is empirically determined based on data of a noise level to account for the different normalization of the template matching and language model. Typical values of $\lambda$ range from 1.1 to 1.6.

To determine a most likely hypothesis $H_L$, different hypotheses H need to be explored and evaluated. In various exemplary embodiments of the methods and systems according to this invention, a Stack algorithm is used explore different hypotheses H to identify the most likely hypothesis $H_L$. In the Stack algorithm, the hypotheses exploration issue of document image decoding is treated as a graph search problem, as discussed in greater detail below.

In various exemplary embodiments of the methods and systems according to this invention, a graph G includes a plurality of vertices V connected by a plurality of edges E. Thus, a graph G can be denoted as:

$$G=(V, E). \quad (13)$$

Each edge e of the plurality of edges E connects vertices v and w of the plurality of vertices V. Thus, each edge e can be denoted as:

$$e=(v, w), \quad (14)$$

where v and w are the beginning and end vertices connected by the edge e.

Figure 2:
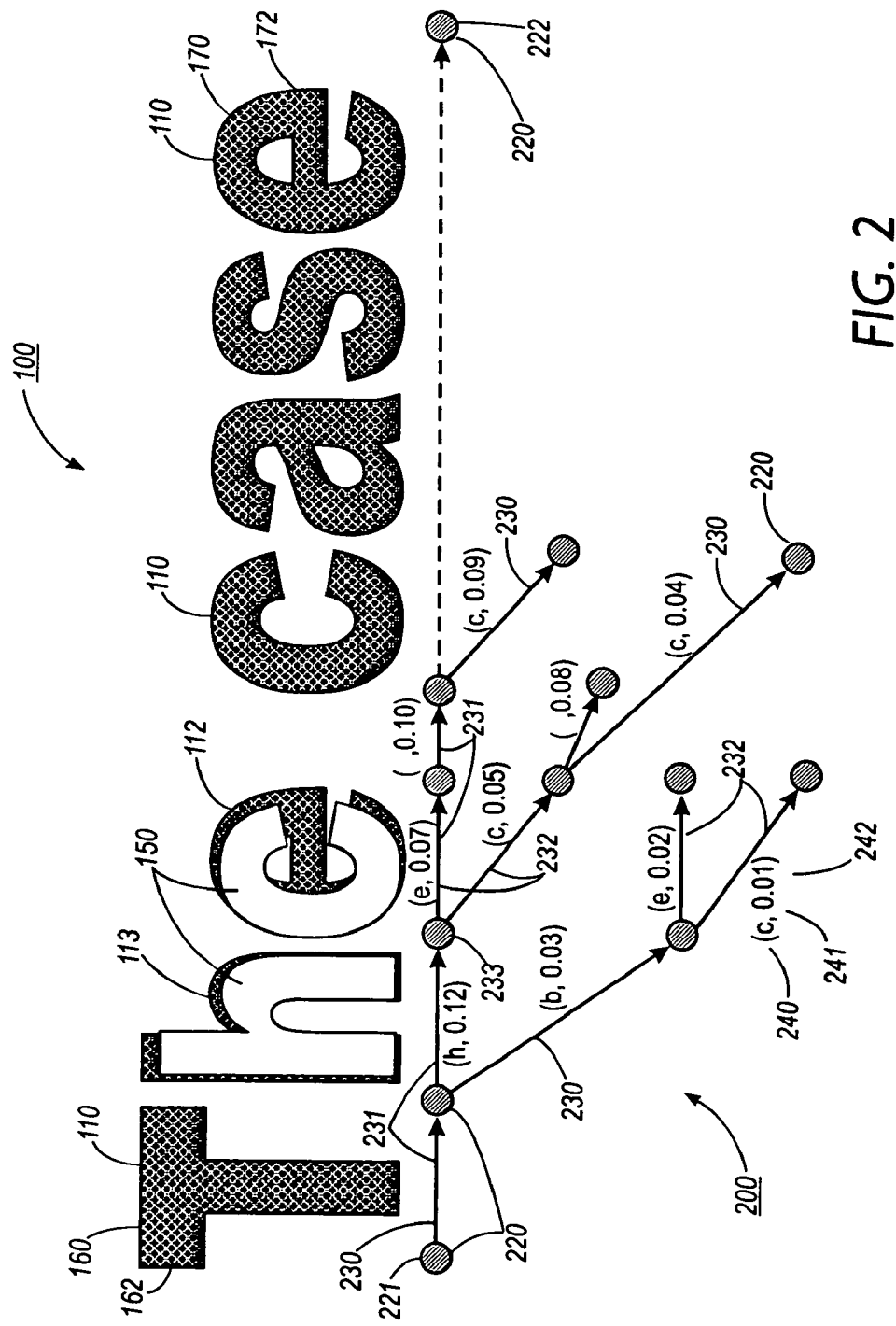
FIG. 2 illustrates one exemplary embodiment of a Stack graph according to this invention for the text fragment shown in FIG. 1.

FIG. 2 illustrates one exemplary embodiment of a Stack graph 200 according to this invention. As shown in FIG. 2, for the text fragment shown in FIG. 1, the Stack graph 200 includes vertices 220 and edges 230. Each edge 230 connects two vertices 220.

Each edge 230 is associated with a character 110, while each vertex 220 is associated with an x-position along the character string. For the text fragment 100, a decoding process starts at a left-most vertex 221, which corresponds to the x-position of the left-most edge 162 of the left-most character 160. The decoding process continues in the direction towards the right-hand side, from one vertex to another, thus decoding one character after another. The decoding process finishes at a right-most vertex 222, which corresponds to the x-position of the right-most edge 172 of the right-most character 170. Accordingly, each vertex 220 represents a decoding state in the decoding process, where moving from one vertex to a subsequent vertex decodes one character.

As shown in FIG. 2, the left-most vertex 221 is a source, and the right-most-vertex 222 is a sink. The source vertex 221 is a special type of vertex 220 that is associated with the beginning of the text fragment 100 and therefore represents the first decoding state of the decoding process. On the other hand, the sink vertex 221 is a special type of vertex 220 that is associated with a possible end of the text fragment, and therefore represents a possible last decoding state of the decoding process.

Each edge 230 is a possible path from one vertex 220 to a subsequent vertex 220, and is therefore a possible decoding step from the one vertex 220 to the next vertex 220 in the decoding process. A group of edges 231 that makes a complete path from the source 221 to a sink 222 is a hypothesis H or a possible solution of the decoding process. In various exemplary embodiment of the methods and systems according to this invention, a decoding solution comprises searching through the Stack graph for a hypothesis H that comprises a plurality of edges connecting between the source and a sink and has a desired total weight.

A character 110 may be associated with a plurality of possible edges 230. For example, in FIG. 2, the third character 112 from the left-hand side is associated with four edges 232 illustrated in FIG. 2 below the third character 112. These four edges illustrate the most likely decodings for the third character 112. However, we have not shown all the edges of the graph, which would include less likely decodings such as x or g. Also, each of the four edges 232 associated with the third character 112 is connected to a preceding vertex 220 associated with an x-position between the second character 113 and the third character 112. Accordingly, the Stack graph has a tree-like configuration, as shown in FIG. 2, in which each vertex 220 in one decoding state branches off to a number of possible vertices 220 in the next decoding state, with one edge for each of the possible template matches. However, when nodes are equivalent for purposes of decoding, they can be combined. For example, in FIG. 2, when no language model is used the nodes 233 can be combined if they correspond to the same x-position on the line. When nodes are combined the tree-like graph in FIG. 2, will become an acyclic graph.

When the stack graph 200 is acyclic, the decoding process continues in a single direction, from the left to the right. Accordingly, each edge 230 points to and develops the tree-like configuration in one direction, i.e., in the direction indicated by the arrows of the edges 230.

As shown in FIG. 2, each edge 230 is associated with a score indicator 240. The score indicator comprises a template indicator 241 and a weight indicator 242. The template indicator 241 indicates a template 250, against which a character 110 in the received image 100 is matched. The weight indicator 242 indicates a measure or a weight of the match between the character 110 and the template 150. The measure or weight thus indicates the degree of correspondence, or the quality of the match, between the current image portion and the corresponding template. FIG. 2 illustrates measures that would correspond to probabilities, and so would be combined with multiplication. Equivalently, one can use measures that correspond to log probabilities and so would be combined with addition.

In the example shown in FIG. 2, the second character 113 compares most favorably with the templates 150 for the letters "h" and "b." The weight for the second character to be an "h" is 0.12, while the weight for the second character to be a "b" is 0.03. Accordingly, the second character is more likely to be an "h."

Along the path in which the second character is identified as "h," the weight for the third character to be an "e" is 0.07, while the weight for the third character to be a "c" is 0.05. Thus, along this path, the third character is more likely to be "e." Similarly, along the path in which the second character is identified as "b," the weight for the third character to be an "e" is 0.02, while the weight for the third character to be a "c" is 0.01. Thus, along this path, the third character is more likely to be "e." However, for each of the characters "e" and "c," these probabilities are less than those for the path in which the second character is identified as "h."

In various exemplary embodiments of the methods and systems according to this invention, each weight indicator 242 indicates a measure of the probability of the template matching and the language content of the corresponding template indicator 241. It is often convenient to use log probabilities for implementation of the weights 242.

In various exemplary embodiments of the methods and systems according to this invention, a vertex v associated with a character is denoted as:

$$K(v)=(x, c_1, c_2, \ldots, c_{d-1}). \tag{15}$$

In Eq. (15), x is the x-coordinate of the character, and the string $c_1, c_2, \ldots c_{d-1}$ is the linguistic context, i.e., the d−1 decoded characters that are to the left of the x-coordinate. Eq. (15) may be rewritten into the form of:

$$K(v)=(K_x(v), K_c(v)), \tag{16}$$

where $K_x(v)$ is the x-coordinate of K(v) and $K_c(v)=c_1, c_2, \ldots, c_{d-1}$ indicates the linguistic context of the vertex K(v).

In various exemplary embodiments of the methods and systems of this invention, the Stack algorithm does not need to explore the whole graph. Instead, only a promising part of the Stack graph is explored. This promising part is identified as that part of the Stack graph that is most likely to produce a solution. Exploring only the promising part of the Stack graph allows for document image decoding efficiency.

In various exemplary embodiments of the methods and systems of this invention, a portion of a Stack graph is generated with a generation function:

$$g(v)=\{w_1, w_2, w_3 \ldots | (v, w_k) \in E\}. \tag{17}$$

The generation function g defined in Eq. (17) enumerates all the edges e leaving a vertex v, or equivalently, all possible next states $w_k$ for a decoding process. In various exemplary embodiment, where $K(v)=(x, c_1, c_2, \ldots, c_{d-1})$, an edge e is defined from the current vertex v to a subsequent vertex $w_k$ if $K(w_k)=(x+w(c_d), c_2, c_3, \ldots, c_d)$ corresponds to decoding the character $c_d$ from the current position x to the next position $x+w(c_d)$ in the received image.

In various exemplary embodiments of the methods and systems according to this invention, a path is a list of vertices that are linked by edges. Accordingly, a path can be expressed as:

$$p=\{v_0, v_1, v_2, \ldots v_n | e_i=(v_{i-1}, v_i) \in E\}, \tag{18}$$

where $v_0, v_1, v_2, v_n, v_{i-1}$, and $v_i$ are vertices.

Figure 3:
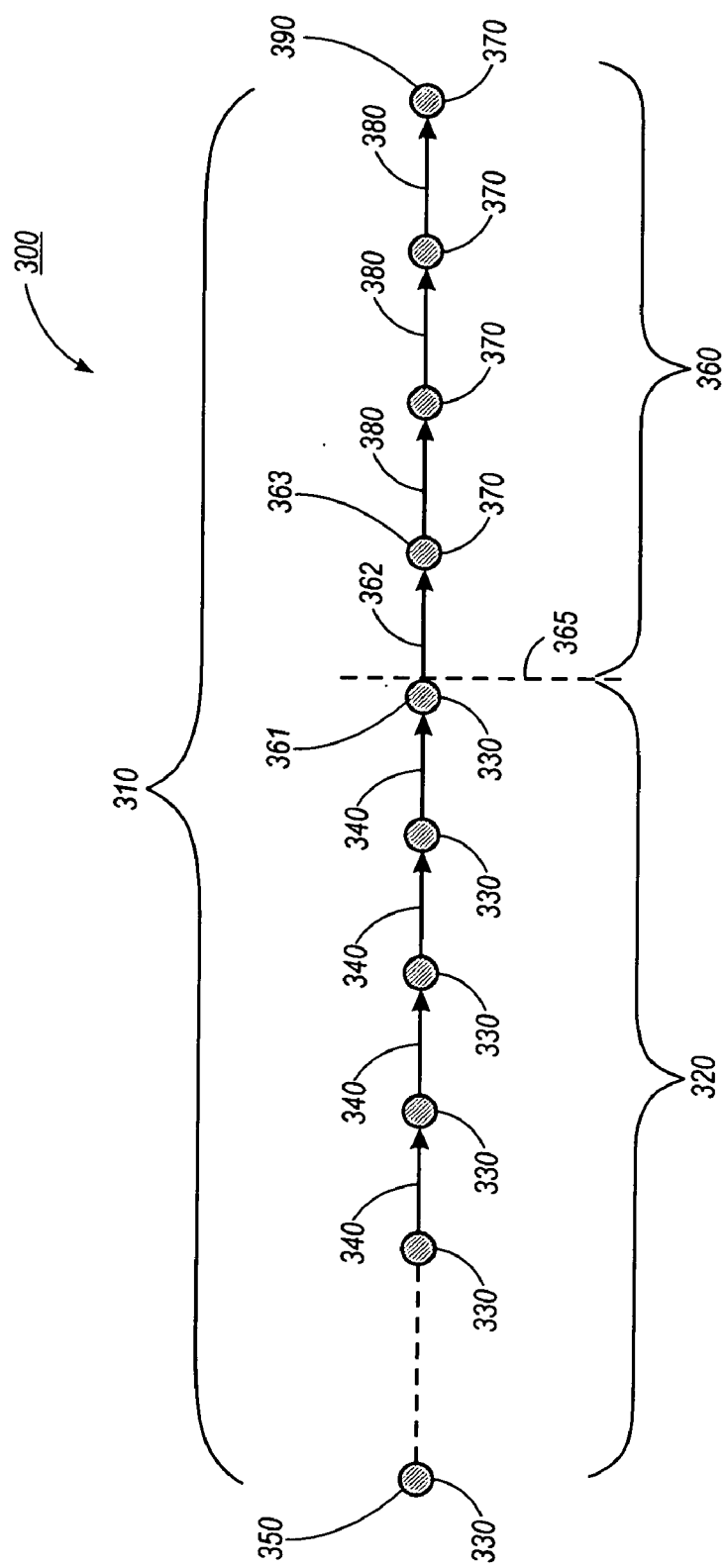
FIG. 3 illustrates one exemplary embodiment of a hypothesis in a Stack graph according to this invention.

In various exemplary embodiments of the methods and systems according to this invention, different paths through the Stack graph correspond to different decoding hypotheses H. FIG. 3 illustrates one exemplary embodiment of a hypothesis in a Stack graph 300. As shown in FIG. 3, a hypothesis 310 is a complete path from a source vertex 350 to a sink vertex 390. The hypothesis 310 comprises a plurality of edges 340, 362, or 380. Each edge 340 or 380 connects two vertices 340 or 370.

As shown in FIG. 3, a partial path 320 is a portion of the hypothesis 310. The partial path 320 starts from the source vertex 350 and ends at a last vertex 361 of the partial path 320.

A suffix of a partial path is the remaining part of the partial path that turns the partial path into a corresponding complete path. As shown in FIG. 3, a suffix 360 of the partial path 320 starts from the last vertex 361 of the partial path 320 and ends at the sink vertex 390.

As indicated above, in various exemplary embodiments of the methods and systems according to this invention, the weight of a path is equal to the log probability of the hypothesis $H_p$ corresponding to the path. Because a path hypothesis $H_p$ includes individual edges, the weight of a path W(p) is determined from the weight of the individual edges $W(v_i, v_{i+1})$ that form the path:

$$W(p) = \sum_i W(v_i, v_{i+1}). \tag{19}$$

In various exemplary embodiments of the methods and systems according to this invention, the weight of each individual edge $W(v_i,v_{i+1})$ includes a likelihood of a template match and a likelihood of a language model:

$$W(v_i, v_{i+1}) = TM(i) + \lambda LM(i), \tag{20}$$

$$W(v_i, v_{i+1})) = \log M(c_i, x_i, Z) + \lambda \log P(c_i | c_{i-d+1}, c_{i-d+2}, \ldots, c_{i-1}). \tag{21}$$

In various exemplary embodiments of the methods and systems according to this invention, the modified Stack algorithm according to this invention searches a Stack graph for a desired path as a solution. The desired path may be an optimal path. For example, the desired path may be a path with a maximum weight among all the paths.

As used herein, the terms "optimize", "optimal" and "optimization" connote a condition where one entity is deemed better than another entity because the difference between the two entities is greater than a desired difference. It should be appreciated that it would always be possible to determine a better entity as the desired difference decreases toward zero. Also, the terms "maximize", "maximum" and "maximization" connote a condition where one entity is deemed greater than another entity because the difference between the two entities is greater than a desired difference. It should be appreciated that it would always be possible to determine a greater entity as the desired difference decreases toward zero. Similarly, the terms "minimize" "minimal" connote a condition where one entity is deemed less than another entity because the difference between the two entities is greater than a desired difference. Again, it should be appreciated that it would always be possible to determine a lesser entity as the desired difference approaches zero.

Accordingly, it should be appreciated that, these terms are not intended to describe an ultimate or absolute condition. Rather, it should be appreciated that these terms are intended to describe a condition that is relative to a desired level of accuracy represented by the magnitude of the desired difference between two or more entities. In various exemplary embodiments of the methods and systems according to this invention, when approaching a result that is optimal, it is satisfactory to stop at a result with a desired result, without having to reach the optimal result. In various other exemplary embodiments of the methods and systems according to this invention, when approaching a result that is maximum, it is satisfactory to stop at a result with a desired result, without having to reach the maximum result.

To search for the desired path, in various exemplary embodiments of the methods and systems according to this invention, the modified Stack algorithm according to this invention uses a priority queue $Q_p$, where partial paths are queued according to their estimated potential to have a high weight when completed. The desired path is determined as a partial path having a desired priority. In various exemplary embodiments of the methods and systems according to this invention, the potential of a partial path is the weight of the partial path adjusted by either adding an estimated completion weight, or subtracting an expected weight for the partial path, as will be discussed in greater detail below. In various exemplary embodiments of the methods and systems according to this invention, the partial path of a desired priority is a partial path with a maximum estimated potential.

In various embodiments of the methods and systems according to this invention, the partial path of a desired priority is listed at the top of the priority queue $Q_p$. In various other exemplary embodiments of the methods and systems according to this invention, the partial paths of a desired priority is listed at the bottom of the priority queue $Q_p$.

According to the modified Stack algorithm according to this invention the priority queue $Q_p$ is iteratively used when searching for a decoding solution. For example, according to the modified Stack algorithm according to this invention, the most promising path (i.e., the partial path with the maximum potential) is removed from the priority queue $Q_p$. If the last vertex of this path is a sink, then the path is complete. Because it was the most promising path on the priority queue, it is an optimal path. Accordingly, the search is completed. Otherwise, the partial path is extended to a next vertex in all possible ways and for each possible next vertex, a new partial path is generated based on that original partial path with an extension to that next vertex. All of the possible new partial paths are placed and queued in the priority queue $Q_p$. The priority queue $Q_p$ is updated to accommodate the new partial paths. According to the modified Stack algorithm according to this invention, the newly listed most promising path for the next iteration is removed from the priority queue $Q_p$.

In various exemplary embodiments of the methods and systems of this invention, an associative map is used to detect semantically equivalent paths and to update paths in the priority queue $Q_p$. In various exemplary embodiments of the methods and systems of this invention, a hash table is used to compare and update paths in the priority queue $Q_p$. The hash table is also used to detect semantically equivalent paths. In various exemplary embodiments of the methods and systems of this invention, the priority queue $Q_p$ is implemented using a heap or a Fibonacci heap to enhance the functionality provided by the hash table.

In various exemplary embodiments of the methods and systems according to this invention, when a new path extends to a vertex of an old path that is already in the priority queue $Q_p$, the new path is semantically equivalent to the old path. There may be three different situations. First, the old path may also end at that vertex, and the new path may have a better or greater weight than the weight of the old path. In various exemplary embodiments of the methods and systems according to this invention, in this situation, the old path is updated and replaced by the new path in the priority queue $Q_p$.

In the second situation, the old path may also end at that vertex, and the weight of the new path is not better than the weight of the old path. In various exemplary embodiments of the methods and systems according to this invention, in this situation, the new path is discarded and the old path remains in the priority queue $Q_p$ at its present location.

In a third, "duplicate extended," situation, the new path has a weight better than that of the old path, but the old path has already been extended past that vertex where the new path joins or intersects the old path. That is, the old path has already been removed at least once from the priority queue and has been placed back in the priority queue extended to at least one additional vertex. Therefore, the old path cannot be easily updated and replaced in the priority queue. In various exemplary embodiments of the methods and systems of this invention, special techniques are introduced into the modified Stack algorithm according to this invention to deal with this problem, as discussed in greater detail below.

In various exemplary embodiments of the methods and systems of this invention, while searching the Stack graph using the Stack algorithm, paths that are being actively explored form a tree-like configuration, as discussed above in connection with FIG. 2. In these exemplary embodiments, each vertex in this tree is associated with a single "back" pointer. The back pointer points to the previous vertex on the path. Similarly, forward pointers can be associated with the vertices as well. Thus, in a "duplicate extended" situation, the extensions of the old path are identified and replaced.

In various other exemplary embodiments of the methods and systems of this invention, in a "duplicate extended" situation, the new path is simply placed into the priority queue $Q_p$ along with the old path.

In various other exemplary embodiments of the methods and systems of this invention, in a "duplicate extended" case, the new path is placed into a re-do queue $Q_r$, and is processed for extensions to replace the extensions of the old path. In various exemplary embodiments of the methods and systems of this invention, the re-do queue $Q_r$ is configured the same as the priority queue $Q_p$, but the re-do queue $Q_r$ lists only new paths generated from the duplicate extended case. Moreover, in various exemplary embodiments, the re-do queue $Q_r$ is processed ahead of the priority queue $Q_p$.

A new partial path is compared to a plurality of desired partial paths to determine whether the new partial path is semantically equivalent to any one of the plurality of desired partial paths. In various exemplary embodiments of the methods and systems according to this invention, the plurality of desired partial paths are all the partial paths in the priority queue $Q_p$. In various other exemplary embodiments of the methods and systems according to this invention, the plurality of desired partial paths are the n most promising partial paths in the priority queue $Q_p$. In various other exemplary embodiments of the methods and systems according to this invention, the plurality of desired partial paths is the single most promising partial path in the priority queue $Q_p$.

Every partial path is in the priority queue $Q_p$ has a weight given by Eq. (19). Because a possibility or likelihood has a value that is less than 1, the log likelihood of each character template match contributes a negative term to a path weight. Accordingly, a shorter path, with fewer characters, would tend to have a higher weight. Accordingly, an adjustment is desirable for comparing paths of different lengths when determining their priorities.

In various exemplary embodiments of the methods and systems according to this invention, the weight of a path $W(p)$ is adjusted by a weight-altering function $W_e(p)$ to produce an adjusted weight $W_a(p)$:

$$W_a(P)=W(P)-W_e(p). \quad (22)$$

In Eq. (22), the adjusted weight $W_a(p)$ is the difference between the actual weight $W(p)$ and the weight-altering function $W_e(p)$. The weight-altering function $W_e(p)$ defines an expected weight for the path. In various exemplary embodiments of the methods and systems according to this invention, shorter paths will have a larger value for the weight-altering function $W_e(p)$. As a result, shorter paths will be weighted appropriately when compared with longer paths. Accordingly, in these exemplary embodiments, the priority queue $Q_p$ is ordered by the value of the adjusted weight $W_a(p)$.

In various other exemplary embodiments of the methods and systems according to this invention, partial paths are listed on the priority queue $Q_p$ based on the predicted weights. A predicted weight $W_p$ for a complete path p that extends a partial path to a sink vertex is defined as:

$$W_p(p)=W(p)+W_f(p), \quad (23)$$

where $W_f(p)$ is an estimate of the weight of a suffix of the path.

As discussed above in connection with FIG. 3, a suffix is a group of vertices and edges representing the portion of the complete path that occurs after, that is, starting with, the last vertex of the partial path. Accordingly, in these exemplary embodiments, the priority queue $Q_p$ is ordered by the predicted weight $W_p(p)$.

In various exemplary embodiments of the methods and systems according to this invention, the x-coordinate of the last vertex in a partial path is used to determine $W_f(p)$. Thus, a suffix of the path is defined as a group of edges $E(x, p)$. Each edge $E(x, p)$ connects two vertices with x-coordinates greater than or equal to the x-coordinate of the last vertex of the partial path:

$$E(x, p)=\{v_k \in p | K_x(v_k) \geq x\}, \quad (24)$$

where x is the x-coordinate of the last vertex on the partial path.

There are usually a plurality of suffices for a partial path, the estimated weight of the complete path is the weight of the suffix that has the highest weight. However, we do not know the suffix with the highest weight (that is the purpose of searching). As will be described in greater detail below, we will use a path from a previous iteration of the algorithm p' that is the current best solution to estimate the weight of the suffix of a partial path $p_j$:

$$W_f(p_j)=W(E(x_j, p')). \quad (25)$$

As discussed above in connection with FIG. 3, a suffix in Eq. (25) starts at a point 361 with the x-coordinate of the end vertex of the last character of the partial path 320. However, the point 361 may be away from a vertex on the previous path p' used to estimate the weight of the suffix. Accordingly, to have a desired accuracy in determining the priority of the partial path, in various exemplary embodiment of the methods and systems according to this invention, an interpolation is used:

$$W_f=W(E(x_j, p'))+I(x_j, (v_{k-1}, v_k)), \quad (26)$$

where $v_k$ is a vertex of p' with the smallest x-coordinate among all vertices with x-coordinates greater than or equal to the x-coordinate $x_j$ of the last vertex 361 of the partial path 320. Accordingly, the edge $e(v_{k-1}, v_k)$ on the path p, indicated as the edge 362 in FIG. 3, crosses x-coordinate $x_j$ of the last vertex 361. Thus, the portion of the previous path p' between the last vertex 361 of the partial path and the next vertex 363 is obtained by an interpolation using the edge $e(v_{k-1}, v_k)$.

In various exemplary embodiments of the methods and systems according to this invention, linear interpolation is used, where $$I(x_j, (v_{k-1}, v_k)) = \frac{x_k - x_j}{x_k - x_{k-1}} W(v_{k-1}, v_k).$$

In various other exemplary embodiments of the methods and systems according to this invention, other interpolation functions, such as non-linear interpolation, can be used.

To improve decoding quality, especially in cases where a received image contains distortion due to, for example, coffee stains or poor image quality in copies near the bindings of documents, it is desirable to iteratively apply the Stack algorithm, using the solution from one iteration as the hypothesis for the next iteration. In various exemplary embodiments of the methods and systems according to this invention, an iteration process is used to approximate a solution of a desired quality. In this iteration process, the Stack algorithm is applied iteratively to obtain a series of solutions $p^{[1]}, p^{[2]}, \ldots, p^{[i]}, \ldots$, where for each iteration i, the solution of a previous iteration $p^{[i-1]}$ is used to define the estimate of a suffix in a next iteration. That is:

$$W_f^{[i]}(p_j) = W(E(x_j, p^{[i-1]})) + I(x_j, (v_{k-1}^{[i-1]}, v_k^{[i-1]})) \quad (28)$$

In various other exemplary embodiments of the methods and systems according to this invention, Eq. (22) is used in the iteration process. That is:

$$W_a^{[i]}(p_j) = W(p_j) - W_e^{[i]}(p_j), \quad (29)$$

As a result, the solution of the previous iteration becomes the expectation for the next iteration. That is:

$$W_e^{[i]}(p_j) = W(\overline{S}(x_j, p^{[i-1]})) + \overline{I}(x_j, (v_{k-1}^{[i-1]}, v_k^{[i-1]})), \quad (30)$$

where:

$$\overline{S}(x, p) = \{v_k \in p | K_x(v_k) < x\}, \quad (31)$$

and $$\overline{I}(x_j, (v_{k-1}, v_k)) = \frac{x_j - x_{k-1}}{x_k - x_{k-1}} W(v_{k-1}, v_k). \quad (32)$$

As shown in Eqs. (29)–(32), $W_e$ is a complementary part of the likelihood of p.

In various exemplary embodiments of the methods and systems according to this invention, Eq. (29) is modified to:

$$W_a^{[1]}(p_j) = W(p_j) - \alpha W_e^{[i]}(p_j), \quad (33)$$

where α is a parameter to enhance convergence to a solution p of a desired quality.

In various exemplary embodiments of the methods and systems according to this invention, α is slightly greater than 1, for example α=1.01.

In certain circumstances, such as under conditions of high noise, an iteration process may develop into an explosive regime. As better paths $p^{[i]}$ are computed, they will affect the estimate of the potential of a partial path, typically in the direction of favoring shorter paths. In an explosive regime, no hypothesis can be identified as being promising enough to extend through the graph. Instead, lots of short hypotheses are processed. As a result, a search originally intended only for a partial Stack graph tends to develop into a full and exhausting search in the whole Stack graph. Consequently, the overall cost quickly becomes prohibitive. Accordingly, having the path search through the Stack graph enter an explosive regime is undesirable and should be prevented.

In various exemplary embodiments of the methods and systems according to this invention, using the modified Stack algorithm according to this invention includes testing to detect when the search process has entered an explosive regime of the iteration process. When entry into an explosive regime is detected, the search is terminated. In such a circumstance, a solution $p^{[i]}$, determined in the last successful iterative step before the termination of the search, is retained as the final solution of the search process, even if this solution has does not meet the desired quality.

In document image decoding, template matching is costly. As discussed above, in various exemplary embodiments of the methods and systems according to this invention, using the modified Stack algorithm according to this invention reduces template matching by using a hash table, so that template matching is not repeated for characters reached by alternative paths, when the only difference between two or more paths to the same portion of the image is in the linguistic context. For example, many edges in the various paths of the graph shown in FIG. 2, where the paths correspond to the same portion of the image, can share the same template matching values. Also, as discussed above, in various other exemplary embodiments of the methods and systems according to this invention, using the modified Stack algorithm according to this invention reduces template matching by exploring only the most promising hypotheses and avoiding exploring the entire graph G.

To further reduce template matching, in various exemplary embodiments of the methods and systems according to this invention, using the modified Stack algorithm according to this invention comprises using a provisional weight in a bounding approach. This bounding approach uses an inexpensive, fast determination of the value of the template match that is an upper bound on the actual template match value. In various exemplary embodiments, this is implemented by defining a provisional weight for a partial path using an upper bound on a template match for the last character on the partial path. The partial path is listed on the priority queue $Q_p$ according to the provisional weight of the partial path. The expensive determination of the actual weight of the partial path is performed only if the partial path, based on the corresponding provisional weight, is found to be the most promising path on the priority queue. This approach thus reduces the amount of the expensive determination of the actual weights of partial paths who are never found to be optimal in view of the provisional weights determined for those partial paths.

Figure 4:
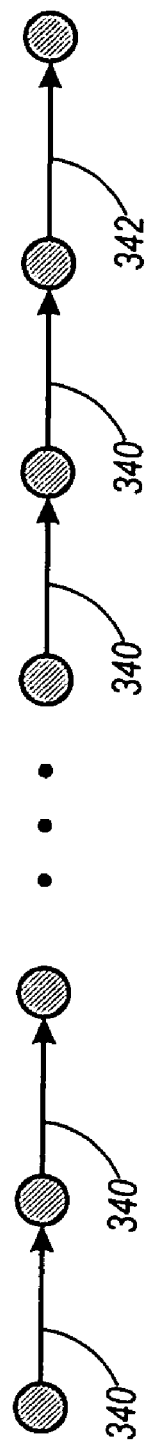
FIG. 4 illustrates one exemplary embodiment of possible extensions of a partial path according to this invention.

FIG. 4 illustrates one exemplary embodiment in which an upper bound is used to score edge 342, so the entire path is scored provisionally.

Accordingly, a provisional path weight is defined for the partial path as the sum of the weight of the partial path and the weight of the upper bound of the extension:

$$W'(p) = \sum_{i=1}^{n-1} W(v_{i+1}, v_i) + W'(v_{n-1}, v_n), \quad (34)$$

where $$W'(v_{n-1}, v_n) \geq W(v_{n-1}, v_n). \quad (35)$$

As is indicated in Eq. (34), a provisional weight of a path includes the actual edges of the path and an extending edge having a weight that is at least as great as the actual weight of the extending edge.

In various exemplary embodiments of the methods and systems according to this invention, when a path to vertex $v_{n-1}$ is being extended to a next vertex $v_n$, a determination is made whether the template match value for the portion of the image corresponding to the x position of the edge ($v_{n-1}$, $v_n$) has already been determined. If the template match value has already been determined, then an actual weight based on the prior matching is assigned to the path and the path with the extension from $v_{n-1}$ to $v_n$ is added to the priority queue. On the other hand, if the template match value has not been determined, an inexpensive upper bound weight is used for the edge extending between the vertices $v_{n-1}$ and $v_n$ to generate a provisional weight and the path with the extension from $v_{n-1}$ to $v_n$ is added to the priority queue with the provisional weight. Only the provisionally weighted paths that are taken from the priority queue $Q_p$ for extension are redetermined with actual weights, and then requeued.

In various exemplary embodiments of the methods and systems according to this invention, provisionally weighted paths are actually weighted before a duplicate path reduction process is performed, such as the duplicate path reduction process discussed above in connection with the use of a hash table. In various exemplary embodiments of the methods and systems according to this invention, a newly extended provisional path having an upper bound that is less than the weight of a semantically equivalent, actually weighted path is discarded.

Figure 5:
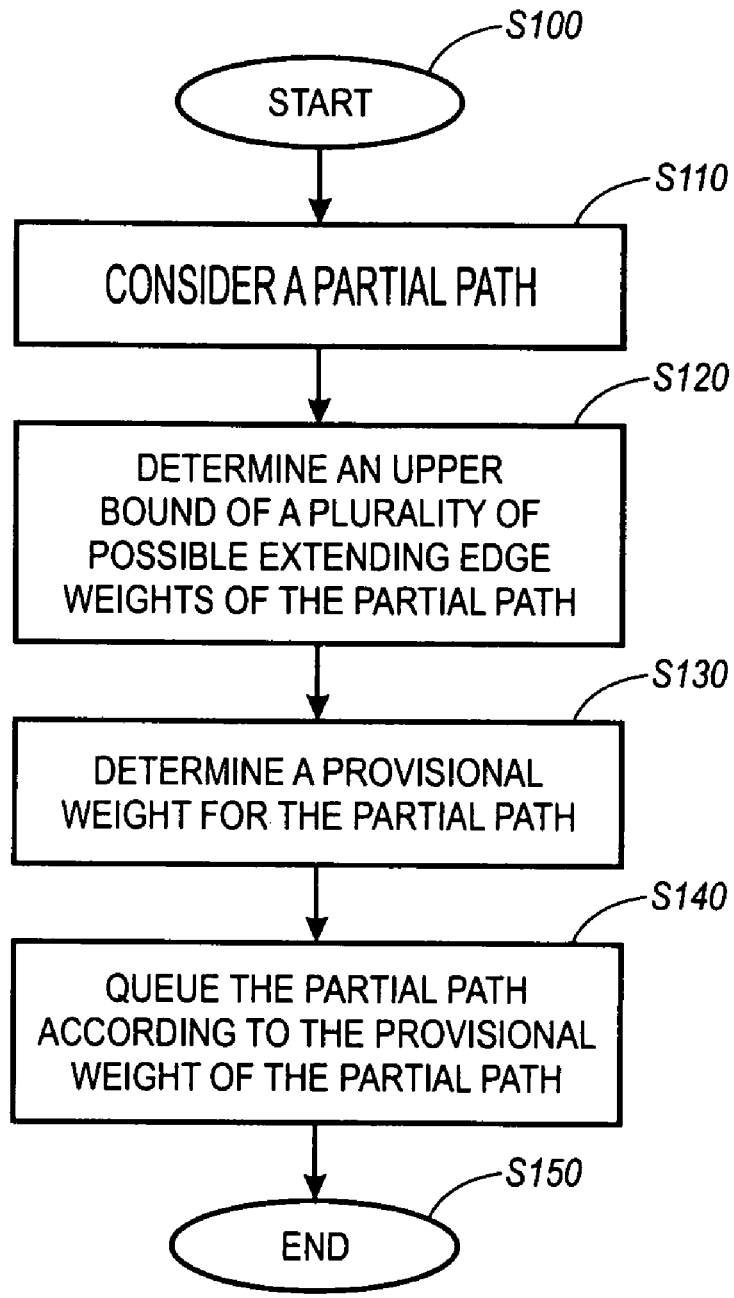
FIG. 5 is a flowchart outlining one exemplary embodiment of a method for queuing a partial path according to a provisional weight of the partial path.

FIG. 5 is a flowchart outlining one exemplary embodiment of a method for queuing a partial path according to its provisional weight. Beginning in step S100, operation of the method continues to step S110, where a partial path is considered. Next, in step S120, an upper bound of a plurality of possible extending edge weights of the partial path is determined. Then, in step S130, a provisional weight for the partial path is determined. Next, in step S140, the partial path is queued according to the determined provisional weight of the partial path. Operation then continues to step S150, where operation of the method ends.

Figure 6:
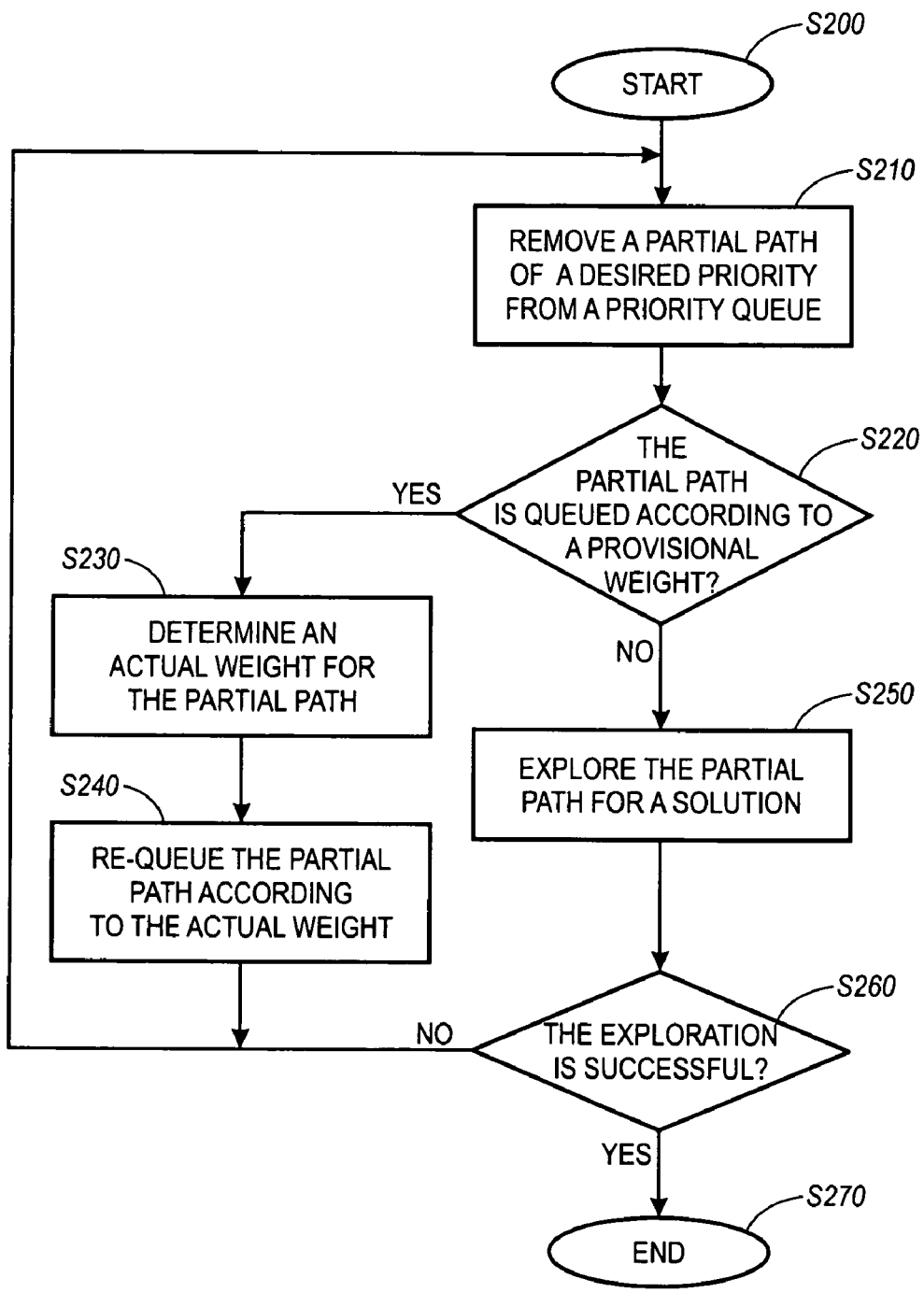
FIG. 6 is a flowchart outlining one exemplary embodiment of a method for exploring a partial path according to this invention.

FIG. 6 is a flowchart outlining one exemplary embodiment of a method for exploring a partial path in a priority queue. Beginning in step S200, operation of the method to continue to step S210, where a partial path of a desired priority is removed from the priority queue. Then in step S220, a determination is made whether the partial path is queued in the priority queue according to a provisional weight of the partial path. If not, operation jumps to step S250. Otherwise, operation proceeds to step S230, where an actual weight of the partial path in place of the provisional weight is determined. Next, in step S240, the partial path is re-queued in the priority queue according to the determined actual weight for that partial path. Operation then returns to step S210.

In step S250, the partial path is explored for a solution. Next, in step S260, a determination is made whether the exploration for a solution is successful. If so, operation jumps to S270, where operation of the method ends. Otherwise, if not, operation returns to step S210.

Figure 7:
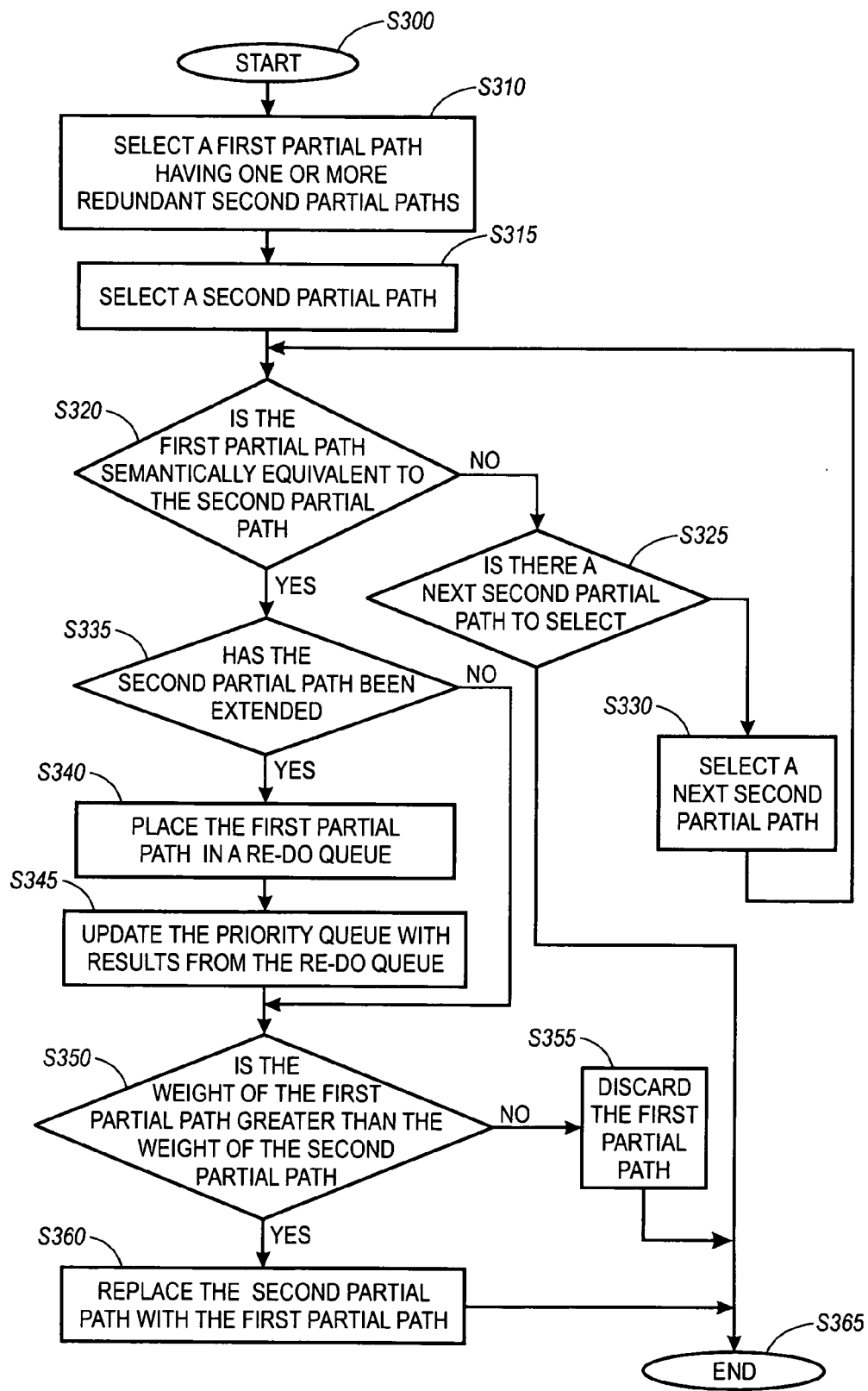
FIG. 7 is a flowchart outlining one exemplary embodiment of a method for reducing redundant hypothesis according to this invention.

FIG. 7 is a flowchart outlining a method for reducing redundant hypotheses. Beginning in step S300, operation of the method continues to step S310, where a first partial path that has at least one redundant second path is selected. In various exemplary embodiments, only one second path is selected. Next, in step S315, a second partial path is selected from a priority queue. Then, in step S320, a determination is made whether the first partial path is semantically equivalent to the second partial path. If so, operation jumps to S335. Otherwise, if not, operation proceeds to step S325.

In step S325, a determination is made whether there is a next redundant second partial path in the priority queue that can be selected. If not, operation jumps to step S365, where operation of the method ends. Otherwise, operation continues to step S330, where a next redundant second partial path is selected from the priority queue. Operation then returns to step S320.

In step S335, a determination is made whether the second partial path has been extended. If not, operation jumps to step S350. Otherwise, operation continues to step S340. In step S340, the first partial path is placed in a re-do queue. Next, in step S345, the re-do queue is processed and the first partial path is extended. This may cause additional paths to be added to the re-do queue. After all extensions of the second partial path are replaced by the extensions of the first partial path, the re-do queue will be empty. Operation then jumps to step S365.

In step S350, a determination is made whether the weight of the first partial path is greater than the weight of the second partial path. If so, operation jumps to step S360. Otherwise, operation proceeds to step S355. In step S355, the first partial path is discarded. Operation then jumps to step S365. In contrast, in step S360, the second partial path is replaced by the first partial path. Operation then continues to step S365 where operation of the method ends.

Figure 8:
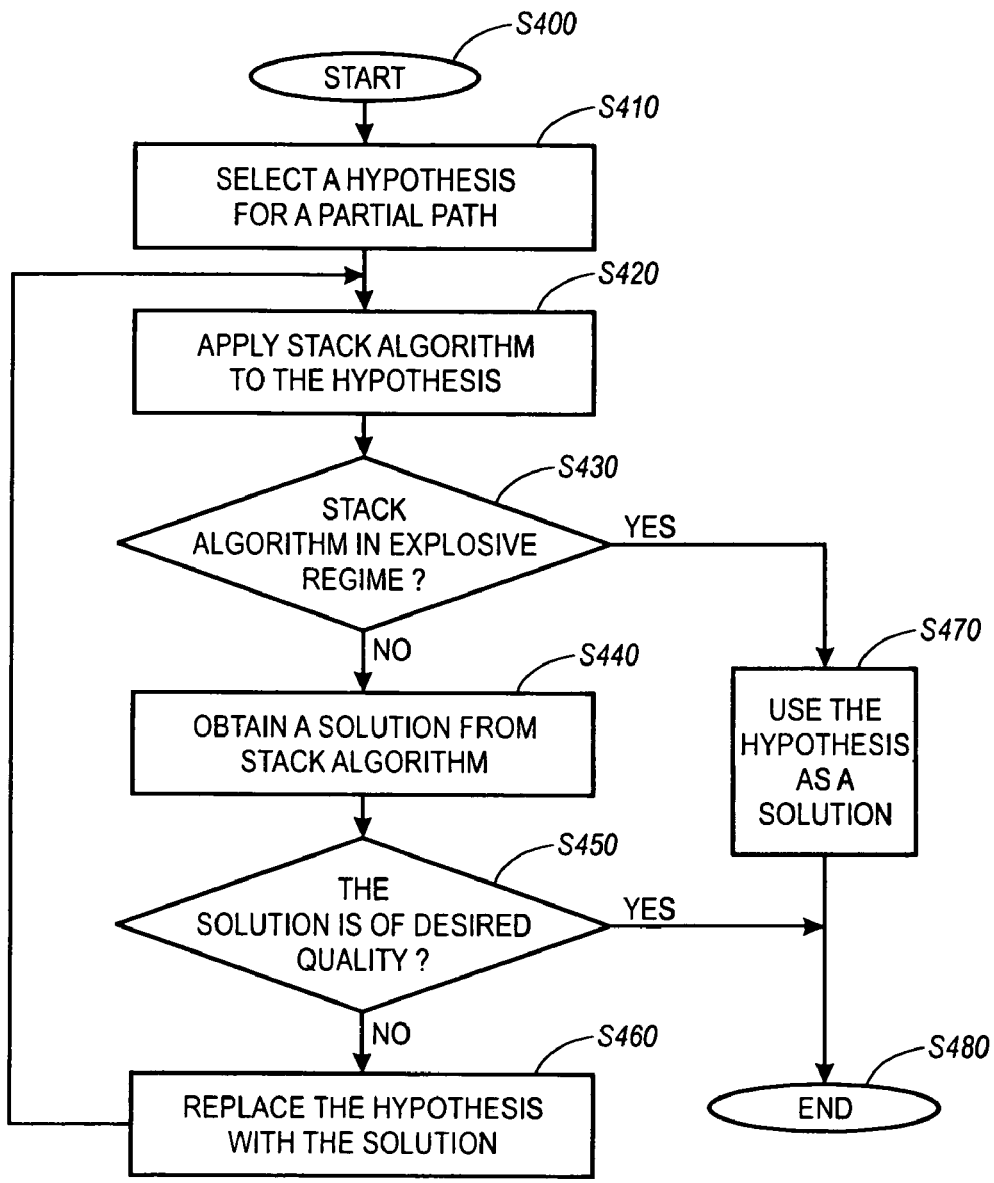
FIG. 8 is a flowchart outlining one exemplary embodiment of a method for iterating an application of a Stack algorithm.

FIG. 8 is a flowchart outlining one exemplary embodiment of a method for iteratively applying the Stack algorithm to obtain an improved or an optimal decoding solution. Beginning in step S400, operation of the method proceeds to step S410, where a hypothesis for a partial path is selected as a current hypothesis. Next, in step S420, the Stack algorithm is applied. Then, in step S430, a determination is made whether the Stack algorithm is in an explosive regime. If so, operation jumps to step S470. Otherwise, if not, operation continues to step S460.

In step S440, a solution is obtained by applying the Stack algorithm to the current Stack graph. Next, in step S450, a determination is made whether the solution is of a desired quality. If not, operation continues to step S460, where the current hypothesis is replaced by the solution. That is, the solution becomes the current hypothesis. Then, operation returns to step S420. Otherwise, operation jumps to step S480.

In contrast, in step S470, the previous hypothesis is used as a solution. Operation then proceeds to step S480, where operation of the method ends.

In various exemplary embodiments of the methods and systems according to this invention, the desired quality used in step S460 is predetermined. In various other exemplary embodiment of the methods and systems according to this invention, the desired quality used in step S460 is dynamically determined during the application of the Stack algorithm.

Figure 9:
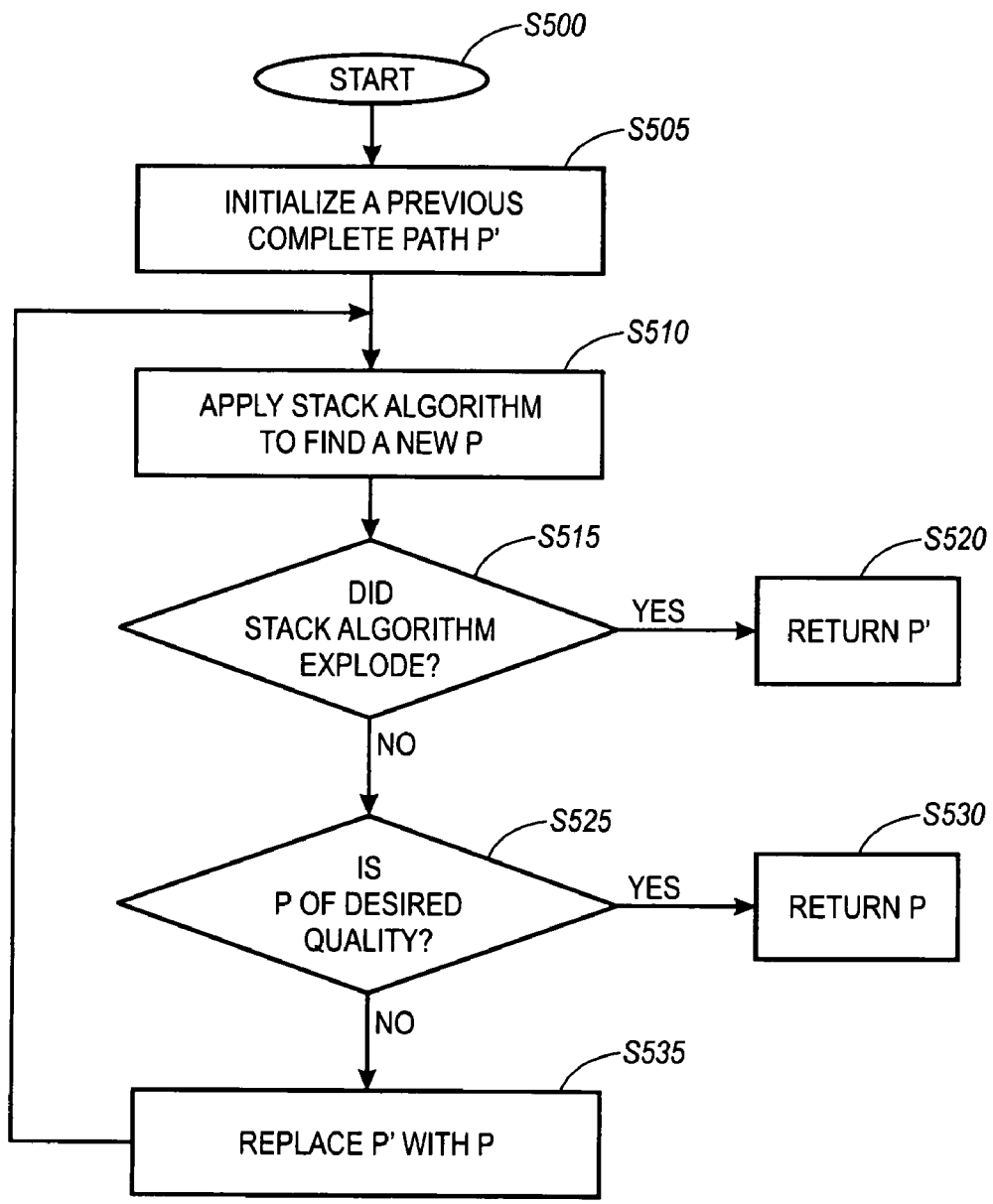
FIG. 9 is a flowchart outlining one exemplary embodiment of a method for a document image decoding using a modified Stack algorithm.
Figure 10:
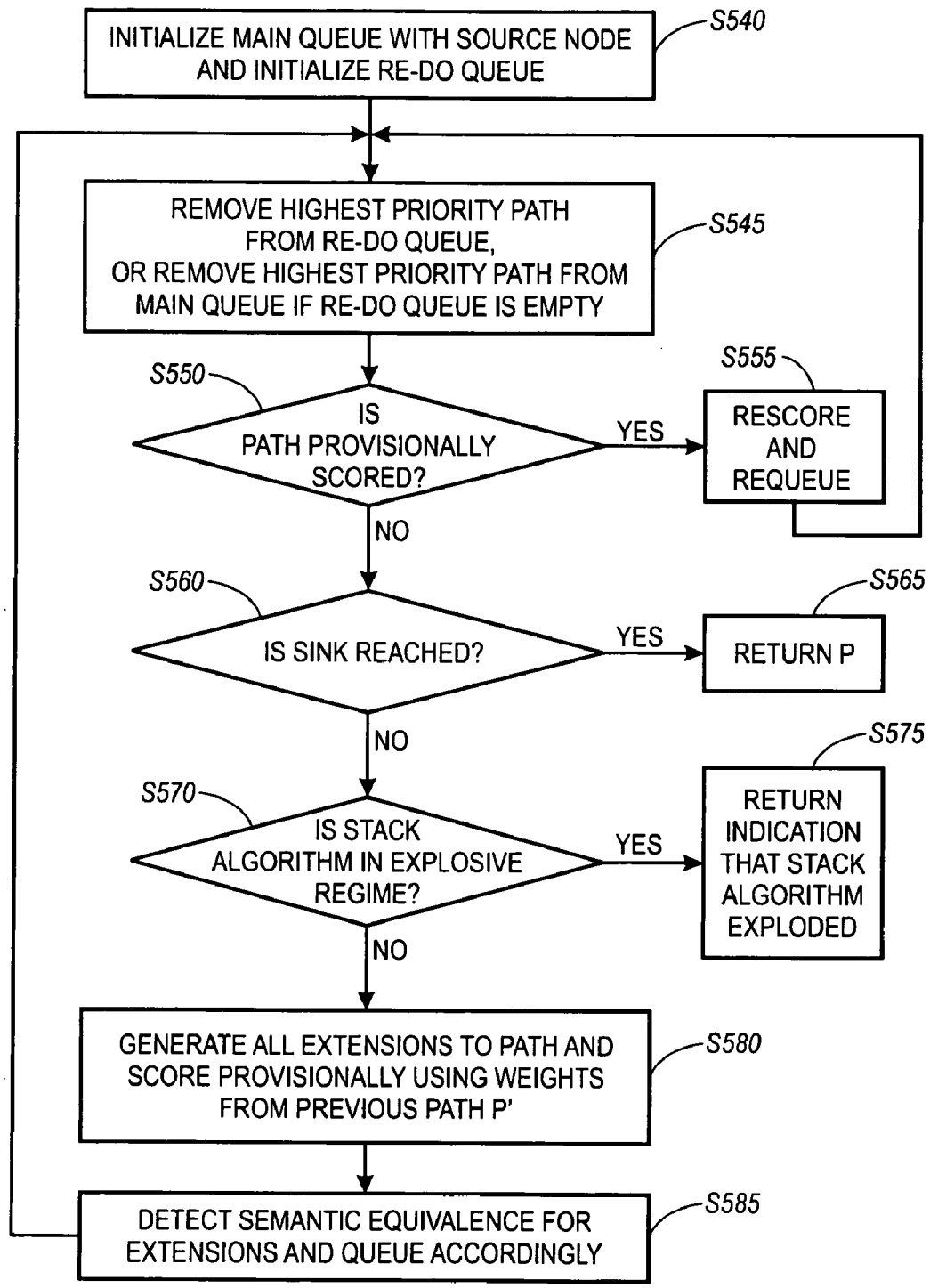
FIG. 10 is a flowchart outlining one exemplary embodiment of a method for a document image decoding using a modified Stack algorithm.
Figure 11:
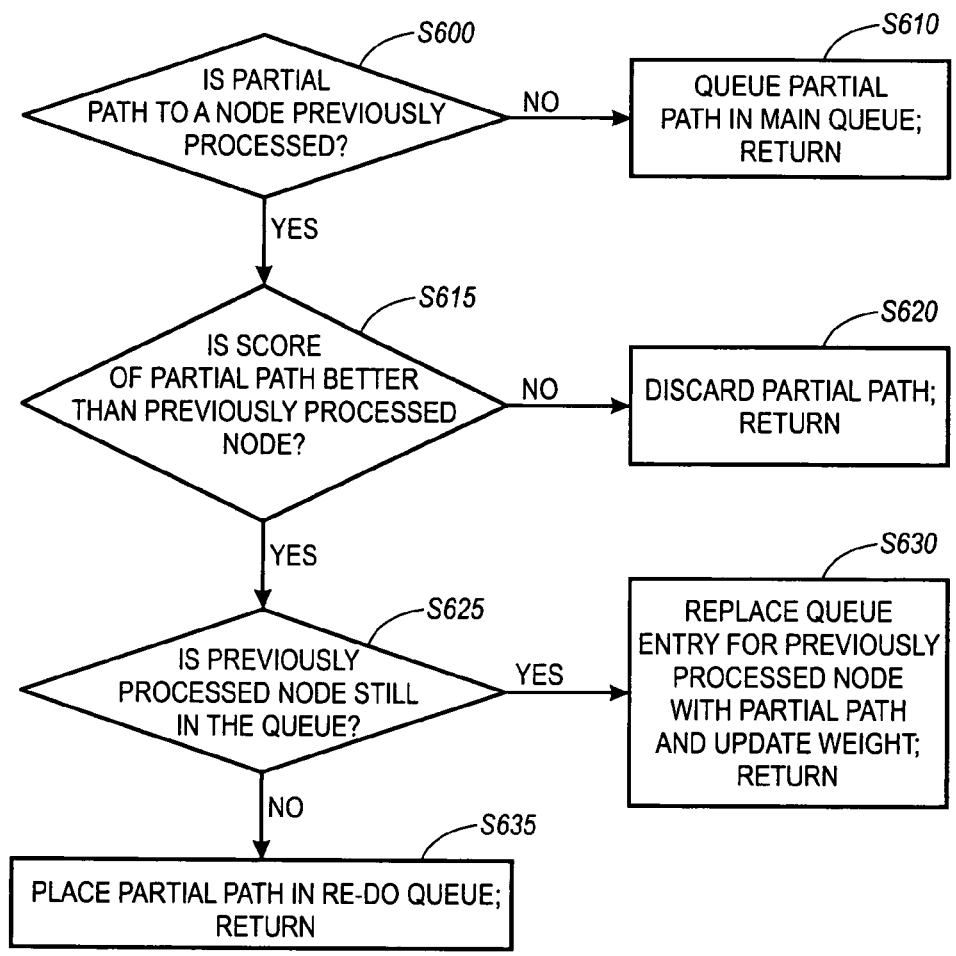
FIG. 11 is a flowchart outlining one exemplary embodiment of a method for a document image decoding using a modified Stack algorithm.

FIGS. 9–11 are a flowchart outlining one exemplary embodiment of a method for document image decoding using a modified Stack algorithm according to this invention. As shown in FIG. 9, beginning in step S500, operation of the method continues to step S505, where a previous complete path P' is initialized. In various exemplary embodiments, a complete path obtained from another method without a language model is used as a previous complete path P'. In various other exemplary embodiments, the previous complete path P' is casually assumed. The quality of the assumed previous complete path P' is not essential to the ultimate output of the exemplary embodiments of the method according to the invention, because this assumed previous complete path P' will soon replaced as operation of the method proceeds.

Next, in step S510, Stack algorithm is applied to find a new path P. This step will be discussed in greater detail below in connection with FIG. 10. Then, in step S515, a determination is made whether the Stack algorithm exploded. If it is determined in step S515 that the Stack algorithm exploded in step S510, operation proceeds to step S520, where the previous complete path P' is returned as the output of operation, and operation of the method ends. Otherwise, if it is determined in step S515 that the Stack algorithm did not exploded in step S510, operation jumps to step S525.

In step S525, a determination is made whether the new complete path P is of a desired quality. If so, operation proceeds to step S530, where operation returns the complete path P as the output of operation of the method and operation of the method ends. On the other hand, if it is determined in step S525 that the new complete path P is not of the desired quality, operation jumps to step S535. In step S535, the new complete path P replaces the previous complete path P' and operation returns to step S510.

FIG. 10 shows greater details of step S510 in the exemplary embodiment shown in FIG. 9. As shown in FIG. 10, operation proceeds to Step S540.

In step S540, a main queue is initialized, as a priority queue, with the source node, and a re-do queue is initialized as being empty. Next, in step S545, a highest priority path is removed from the re-do queue, if the re-do queue is not empty. In the case when the re-do queue is empty, a highest priority path is removed from the main queue.

Next, in step S550, a determination is made whether the removed path is provisionally scored. If it is determined that the removed path is provisionally scored, operation proceeds to step S555, where the removed path is rescored and requeued, and operation returns to step S545. On the other hand, if it is determined that the removed path is not provisionally scored, operation jumps to step S560.

In step S560, a determination is made whether a sink is reached. If so, operation jumps to step S665, where the removed path is returned as the output of operation and operation of the method returns to step S510 in FIG. 9. Otherwise, operation continues to step S570.

In step S570, a determination is made whether the Stack algorithm is in explosive regime. If so, operation jumps to step S755, where operation of the method returns to step S510 in FIG. 9 with an indication that the Stack algorithm exploded. Otherwise, operation continues to step S580.

In step S580, all extensions to the removed path are generated and scored provisionally using weights from the previous path P'. Then, in step S585, semantic equivalence for extensions are detected and the extensions are queued accordingly, as will be discussed in greater detail below in connection with FIG. 11. Operation then returns to step S545.

FIG. 11 shows greater details of step S585 in the exemplary embodiment shown in FIG. 10. As shown in FIG. 11, operation proceeds to Step S600.

In step S600, a determination is made whether a partial path to a node has been previously processed. If so, operation proceeds to step S615. Otherwise, operation jumps to step S610, where the partial path is queued in the main queue and operation returns to step S585 in FIG. 10.

In step S615, a determination is made whether the score of the partial path is better than that of the previously processed node. If so, operation proceeds to step S625. Otherwise, operation jumps to step S620, where the partial path is discarded and operation returns to step S585 in FIG. 10.

In Step S625, a determination is made whether the previously processed node is still in the main queue. If so, operation proceeds to step S630. Otherwise, operation jumps to step S635, where the partial path is placed in the re-do queue and operation returns to step S585 in FIG. 10.

In step S630, the queue entry in the main queue for the previously processed node is replaced with the partial path and the weight of this path in the main queue is updated. Thereafter, operation of the method returns to step S585 in FIG. 10.

Figure 12:
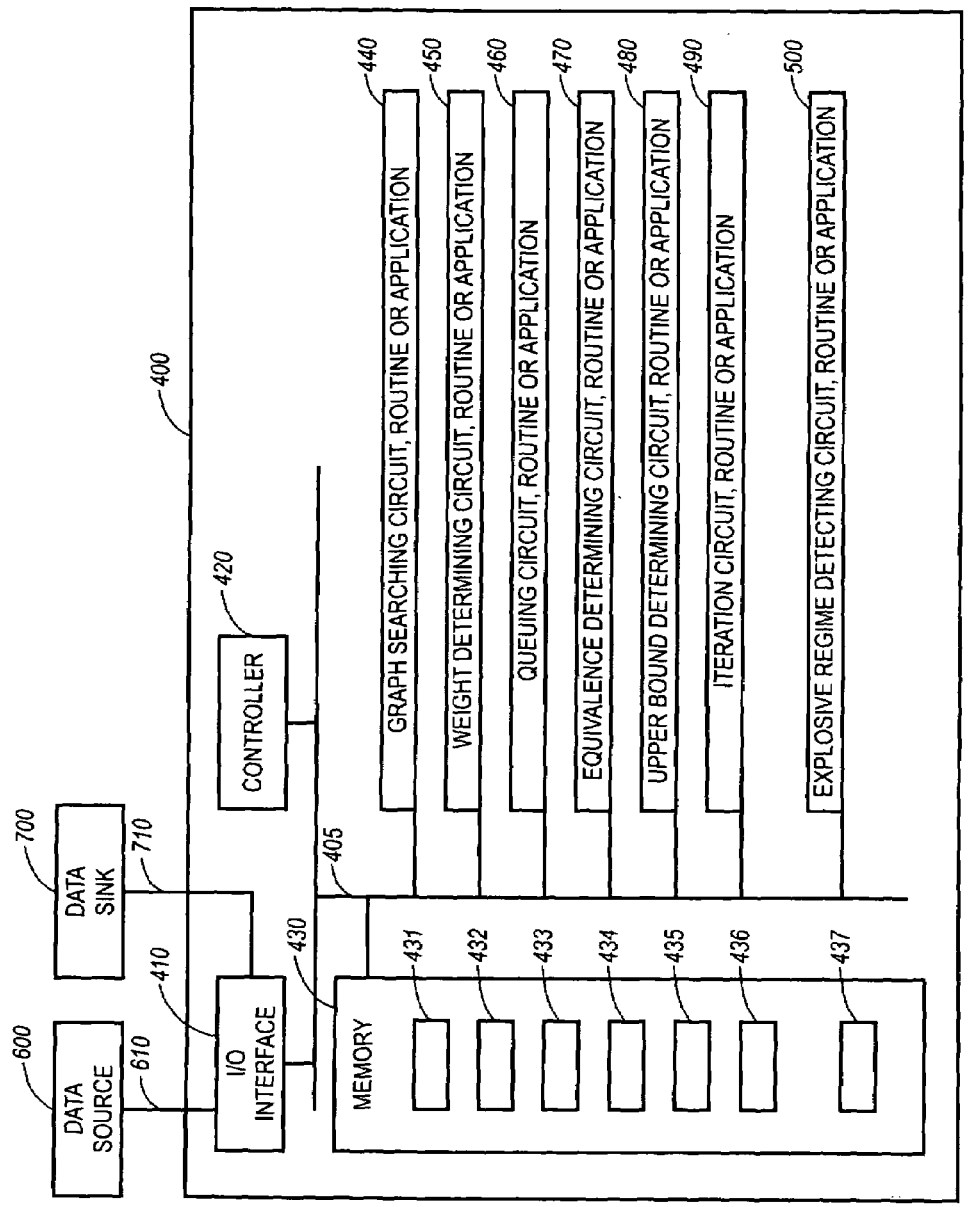
FIG. 12 is a block diagram of one exemplary embodiment of a document image decoding system according to this invention.

FIG. 12 is a block diagram outlining one exemplary embodiment of a document image decoding system 400 according to this invention. As shown in FIG. 12, the document image decoding system 400 comprises one or more of an input/output (I/O) interface 410, a controller 420, a memory 430, a graph searching circuit, routine or application 440, a weight determining circuit, routine or application 450, a queuing circuit, routine or application 460, an equivalence determining circuit, routine or application 470, an upper bound determining circuit, routine or application 480, an iteration circuit, routine or application 490, and/or an explosive regime detecting circuit, routine or application 500, each interconnected by one or more control and/or data busses and/or one or more application programming interfaces 405.

As shown in FIG. 12, the document image decoding system 400 is, in various exemplary embodiments, implemented on a programmed general purpose of a computer. However, the document image decoding system 400 can also be implemented on a special purpose computer, a programmed microprocessor or microcontroller in peripheral integrated circuit elements, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 5–11 can be used to implement the document image decoding system 400.

The I/O interface 410 interacts with the outside of the document image decoding system 400. For example, the I/O interface 410 receives an image from an image data source 600 over a link 610. The I/O interface 410 also outputs a solution to an image sink 700 over a link 710. The I/O interface 410 may also be connected to one or more user input devices and/or one or more output devices, such as an interactive screen, or the like.

As shown in FIG. 12, the memory 430 can be implemented using any appropriate combination of alterable, volatile or non-volatile memory or non-alterable or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory can be implemented using any one or more of ROM, PROM, EPROM, EEPROM, an optical ROM, such as a CD-ROM or DVD-ROM disk and disk drive or the like.

The memory 430 stores information received from the I/O interface 410, such as image data received by the I/O interface 410. The memory 430 also stores information and/or data from various ones of the circuits, routines or applications 440–500 of the document image decoding system 400 during or at intermediate steps of the document image decoding process.

As shown in FIG. 12, the memory 430 includes one or more of an image portion 431, which stores received images; a graphic configuration portion 432, which stores vertices, edges, and the like, for a Stack graph; a weight portion 433, which stores weights of edges, paths, suffices, and the like, and provisional weights; a priority queue portion 434, which stores information related to the priority queue; a re-do queue portion 435, which stores information related to the re-do queue; a solution portion 436, which stores decoding solutions, such as text strings recognized from the received document image; and/or a quality portion 436, which stores quality requirements, such as a desired quality that is used in a iteration process.

As shown in FIG. 12, the one or more control and/or data busses and/or application programming interfaces 405 provide communication and data transfer among various ones of the circuits, routines or applications 440–500 of the document image decoding system 400. The controller 420 provides instructions to various ones of the circuit, routine or application 440–500 of the document image decoding system 400.

In the document image decoding system 400 shown in FIG. 12, the graph searching circuit, routine or application 440 explores partial paths and searches for solutions, e.g., recognized text strings, in a Stack graph. The weight determining circuit, routine or application 450 determines weights for various paths, including determining template matching components, language model components, interpolations, and/or the parameters $\lambda$ and/or $\alpha$. The queuing circuit, routine or application 460 queues various paths in various queues, such as the priority queue and the re-do queue, according to various criteria such as weights and provisional weights.

The equivalence determining circuit, routine or application 470 determines whether a first path is semantically equivalent to a second path, and, if the first path is semantically equivalent to the second path, decides whether to discard the first path or to replace the second path in a priority queue with the first path. The upper bound circuit, routine or application 480 determines an upper bound of the weights of a plurality of possible extended paths of a partial path. The iteration circuit, routine or application 490 manages an iteration process, including generating hypothesis, checking the quality of solutions and replacing hypotheses with solutions. The explosive regime detecting circuit, routine or application 500 detects whether the Stack algorithm is in an explosive regime and, if the Stack algorithm is in an explosive regime, terminates the application of the Stack algorithm and retains the last successful solution.

The image data source 600 can be any one of a number of different sources, such as a digital copier, a facsimile device, a digital camera, a scanner, or a locally or remotely located computer, or any other known or later-developed device that is capable of generating electronic image data. Similarly, the data source 600 can be any suitable device that stores and/or transmits electronic image data, such as a client or a server of a network or the Internet, and especially the World Wide Web.

In various exemplary embodiments, the data source 600 can be integrated with the document image decoding system 400, such as in a digital optical character recognizer having an integrated image receiver, such as a scanner. In various other exemplary embodiments, the image data source 600 can be connected to the I/O interface 410 over the link 610. The link 610 can be implemented using a connection device such as a modem, a local area network, a wide area network, an intranet, the Internet, and any other distributed processing network, or any other known or later-developed connection structure.

It should be appreciated that, while the electronic image data can be generated at the time of decoding a document image from an original physical document, the electronic image data could have been generated at any time in the past. The image data source 600 is thus any known or later-developed source which is capable of supplying electronic image data to the I/O interface 410. For example, the image data source 600 may be a data carrier such as a magnetic storage disk, CD-ROM or the like, or a host computer that contains scanned image data. Thus, the image data source 600 can be any known or later-developed source that is capable of providing image data to the document image decoding system 400 according to this invention.

Also, the data sink 700 can be any known or later-developed device that is capable of receiving a recognized text string output by the document image decoding system 400 and either storing, transmitting or displaying the solutions. In various exemplary embodiments, the data sink 700 can be integrated with the document image decoding system 400. In various other exemplary embodiments, the data sink 700 can be connected to the I/O interface 410 over the link 710. The link 710 can be implemented using a connection device such as a modem, a local area network, a wide area network, an intranet, the Internet, and any other distributed processing network, or any other known or later-developed connection device.

In various exemplary embodiments of the operation of the document image decoding system 400 according to this invention, a user uses the document image decoding system 400 shown in FIG. 12 to generate a recognized text string from a received document image. In operation, the I/O interface 410 of the document image decoding system 400, under control of the controller 420, receives document image data from the image data source 600 over the link 610 and stores the received document image data in the image portion 431. The graph searching circuit, routine or application 440, under control of the controller 420, then uses document image decoding and the modified Stack algorithm according to this invention to generate a Stack graph from the received document image and to search for partial paths within the generated Stack graph. The weight determining circuit, routine or application 450, under control of the controller 420, determines a weight for each partial path. The queuing circuit, routine or application 460, under control of the controller 420, queues the various partial paths in the priority queue according to the weights of the partial paths and, under control of the controller 420, stores the updated priority queue in the priority queue portion 434. The results from graph searching are stored in the graph configuration memory 432. The determined weights are stored in the weight portion 433.

The upper bound circuit, routine or application 480, under control of the controller 420, determines an upper bound of a plurality of possible extending edge weights for the partial path. For a new partial path, the weight determining circuit, routine or application 450, under control of the controller 420, determines a provisional weight for the partial path based on the weight of the partial path and the upper bound of the plurality of a possible extending edge weights of the partial path. The queuing circuit, routine or application 460, under control of the controller 420, queues the partial path according to the provisional weight of the partial path, and, under control of the controller 420, stores the updated priority queue in the priority queue portion 434.

In various exemplary embodiments of the document image decoding system 400, the graph searching circuit, routine or application 440, under control of controller 420, removes a partial path of a desired priority from the priority queue stored in the priority queue portion 434. The queuing circuit, routine or application 460 determines whether the partial path is queued according to the provisional weight of the partial path. When the queuing circuit, routine or application 460, under control of the controller 420, determines that the partial path is queued according to the provisional weight of the partial path, the weight determining circuit, routine or application 450, under control of the controller 420, determines an actual weight of the partial path. Then, the queuing circuit, routine or application 460, under control of the controller 420, re-queues the partial path in the priority queue according to the actual weight of the partial path determined by the weight determining circuit, routine or application 450.

On the other hand, when the queuing circuit, routine or application 460 determines that the partial path is not queued according to a provisional weight of the partial path, the graph searching circuit, routine or application 440, under control of the controller 420, explores a solution for the partial path. If the exploration is successful, the graph searching circuit, routine or application 440, under control of the controller 420, stops the exploration. Otherwise, if the graph searching circuit, routine or application 440 determines that the exploration is not successful, the graph searching circuit, routine or application 440, under control of the controller 420, returns to the priority queue portion 434 to select a next partial path of a desired priority and to repeat the exploration for the selected next partial path.

In various exemplary embodiments, the equivalence determining circuit, routine or application 470 compares a first partial path with a second partial path on the priority queue. The equivalence determining circuit, routine or application 470, under control of the controller 420, determines whether the first partial path is semantically equivalent to the second partial path. If the equivalence determining circuit, routine or application 470 determines that the first partial path is not semantically equivalent to the second partial path, the equivalence determining circuit, routine or application 470, under control of the controller 420, selects a next second partial path on the priority queue, until the first partial path is compared to each second partial path.

Each time the first partial path is determined to be semantically equivalent to the current selected second partial path, the equivalence determining circuit, routine or application 470, under control of the controller 420, compares the weight of the first partial path with the weight of the current second partial path. If the weight of the first partial path is not greater than the weight of the current second partial path, the equivalence determining circuit, routine or application 470, under control of the controller 420, discards the first partial path. In this case, if the first partial path was originally on the priority queue, the queuing circuit, routine or application 460, under control of the controller 420, updates the priority queue and stores the updated priority queue in the priority queue memory 434.

On the other hand, if the weight of the first partial path is greater than the weight of the second partial path, the equivalence determining circuit, routine or application 470, under control of the controller 420, determines whether the second partial path has been extended, based on the information stored at the graph configuration memory 432. If the equivalence determining circuit, routine or application 470 determines that the second partial path has been extended, the queuing circuit, routine or application 460, under control of the controller 420, queues the first partial path in a re-do queue and stores the information of the re-do queue in the re-do queue memory 435. If the equivalence determining circuit, routine or application 470 determines that the second partial path has not been extended, the equivalence determining circuit, routine or application 470, under control of the controller 420, replaces the second partial path by the first partial path. Accordingly, the queuing circuit, routine or application 460, under control of the controller 420, updates the priority queue, and stores the updated priority queue in the priority queue memory 434.

Where the first partial path is listed in the re-do queue, the graph searching circuit, routine or application 440, under control of the controller 420, explores the first partial path listed on the re-do queue. The weight determining circuit, routine or application 450, under control of the controller 420, determines the weights of the extended, first partial path. The queuing circuit, routine or application 460, under control of the controller 420, queues the extended, first partial path in the priority queue to replace the extended second partial path, and stores the updated priority queue in the priority queue memory 434.

It should be appreciated that, in some exemplary embodiments, one or more of the graph searching circuit, routine or application 440, the weight determining circuit, routine or application 450, the queuing circuit, routine or application 460, the equivalence determining circuit, routine or application 470, the upper bound determining circuit, routine or application 480, the iteration circuit, routine or application 490, and/or the explosive regime detecting circuit, routine or application 500 can be omitted, should the particular functions implemented by those circuits, routines or applications be left out of the particular implementation of the modified Stack algorithm according to this invention.

Similarly, it should be appreciated that, in some other exemplary embodiments, one or more of the image memory 431, the graphic configuration memory 432, the weight memory 433, the priority queue memory 434, the re-do queue memory 435, the solution memory 436 and/or the quality memory 436 can be omitted.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for reducing hypothesis exploration in document image decoding incorporating a Stack algorithm comprising:

determining whether a first partial path is semantically equivalent to a second partial path, the second partial path having already been processed, wherein the first partial path has a first weight $W_1$, and the second partial path has a second weight $W_2$;

determining whether the second partial path has been extended further into a Stack graph than the first partial path: and adjusting a queue or discarding one of the first partial path and the second partial path if the first partial path is semantically equivalent to the second partial path by placing the first partial path in a second queue if the second partial path has been extended further into the Stack graph than the first partial path or adding, if the second partial path has been extended and if the first weight $W_1$ is greater than the second weight $W_2$, the first partial path to the first queue.

2. The method of claim 1, wherein at least one of the first weight $W_1$ and the second weight $W_2$ is determined as:

$$W_i = TM + \lambda LM,$$

where:

TM is a template matching component;

LM is a language model component; and $\lambda$ is a parameter.

3. The method of claim 1, wherein adjusting a queue or discarding one of the first partial path and the second partial path comprises discarding the first partial path if the first weight $W_1$ is less than or equal to the second weight $W_2$.

4. The method of claim 1, wherein adjusting a queue or discarding one of the first partial path and the second partial path comprises, if the second partial path does not extend further than the first partial path, replacing the second partial path with the first partial path if the first weight $W_1$ is greater than the second weight $W_2$.

5. The method of claim 4, further comprising processing the second queue to obtain one or more extensions of the first partial path.

6. The method of claim 5, wherein processing the second queue comprises:
   determining a weight for each extension of the first partial path; and
   queuing each extension of the first partial path based on its weight.

7. A method for reducing hypothesis exploration in document image decoding incorporating a stack algorithm, comprising:
   determining whether a first partial path is semantically equivalent to a second partial path that has already been processed by using an associative map to determine whether the first partial path is semantically equivalent to the second partial paths; and
   adjusting a queue or discarding one of the first partial path and the second partial path if the first partial path is semantically equivalent to the second partial path.

8. The method of claim 7, wherein the associative map is implemented using a hash table.

9. The method of claim 1, wherein the queue is implemented using a heap.

10. A computer storage medium having executable software code, the executable software code including:
    instructions for determining whether a first partial path is semantically equivalent to a second partial path, the second partial path having already been processed, wherein the first partial path has a first weight $W_1$, and the second partial path has a second weight $W_2$; and
    instructions for adjusting a queue or discarding one of the first partial path and the second partial path if the first partial path is semantically equivalent to the second partial path, wherein the instructions for adjusting further includes instructions for determining whether the second partial path has been extended further into a Stack graph than the first partial path, instructions for placing the first partial path in a second queue if the second partial path extends further into the Stack graph than the first partial path, or instructions for adding, if the second partial path has been extended and if the first weight $W_1$ is greater than the second weight $W_2$, the first partial path to the first queue.

11. The computer storage medium of claim 10, wherein at least one of the first weight $W_1$ and the second weight $W_2$ is determined as:

$$W_i = TM + \lambda LM,$$

where:
   TM is a template matching component;
   LM is a language model component; and
   $\lambda$ is a parameter.

12. The computer storage medium of claim 10, wherein the instructions for adjusting include instructions for discarding the first partial path if the first weight $W_1$ is less than or equal to the second weight $W_2$.

13. The computer storage medium of claim 10, wherein the instructions for adjusting include instructions for replacing the second partial path with the first partial path if the first weight $W_1$ is greater than the second weight $W_2$ if the second partial path does not extend further than the first partial path.

14. The computer storage medium of claim 10, wherein the executable software code further includes instructions for processing the second queue to obtain one or more extensions of the first partial path.

15. The computer storage medium of claim 14, wherein the instructions for processing the second queue include:
    determining a weight for each extension of the first partial path; and
    queuing each extension of the first partial path based on its weight.

16. A computer storage medium having executable software code, the executable software code including:
    instructions for determining whether a first partial path is semantically equivalent to a second partial path, wherein the second partial path has already been processed, including instructions for using an associative map to determine whether the first partial path is semantically equivalent to the second partial path; and
    instructions for adjusting a queue or discarding one of the first partial path and the second partial path if the first partial path is semantically equivalent to the second partial path.

17. The computer storage medium of claim 16, wherein the associative map is implemented using a hash table.

18. The computer storage medium of claim 10, wherein the queue is implemented using a heap.

19. A system for reducing hypothesis exploration in document image decoding incorporating a Stack algorithm comprising:
    an equivalence determining circuit, routine or application that determines whether a first partial path is semantically equivalent to a second partial path, the second partial path having already been processed, wherein the first partial path has a first weight $W_1$ and the second partial path has a second weight $W_2$;
    a graph searching circuit, routine or application, wherein the graph searching circuit, routine or application determines whether the second partial path has been extended further into a Stack graph than the first partial path; and
    a queuing circuit, routine or application;
    wherein:
    the queuing circuit, routine or application adjusts a queue or discards one of the first partial path and the second partial path if the first partial path is semantically equivalent to the second partial path by placing the first partial path in a second queue if the second partial path extends further into the Stack graph than the first partial path or by adding, if the second partial path has been extended and if the first weight $W_1$ is greater than the second weight $W_2$, the first partial path to the first queue.

20. The system of claim 19 wherein at least one of the first weight $W_1$ and the second weight $W_2$ is determined as:

$$W_i = TM + \lambda LM,$$

where:
   TM is a template matching component;
   LM is a language model component; and
   $\lambda$ is a parameter.

21. The system of claim 19, wherein the queuing circuit, routine or application adjusts the queue or discards one of the first partial path and the second partial path by discarding the first partial path if the first weight $W_1$ is less than or equal to the second weight $W_2$.

22. The system of claim 19, wherein the queuing circuit, routine or application adjusts the queue or discards one of the first partial path and the second partial path by replacing, if the second partial path does not extend further than the first partial path, the second partial path with the first partial path if the first weight $W_1$ is greater than the second weight $W_2$.

23. The system of claim 19, wherein the graph searching circuit, routine or application processes the second queue to obtain one or more extensions of the first partial path, the first extended partial path having a third weight.

24. The system of claim 23, wherein the queuing circuit, routine or application processes the second queue by:

determining a weight for each extension of the first partial path; and queuing each extension of the first partial path based on its weight.

25. A system for reducing hypothesis exploration in document image decoding incorporating a stack algorithm comprising:

an equivalence circuit, routine or application that determines whether a first partial path is semantically equivalent to a second partial path using an associative map, the second partial path having already been processed; and a queuing circuit, application or routine that adjusts a queue or discards one of the first partial path and the second partial path if the first partial path is semantically equivalent to the second partial path.

26. The method of claim 25, wherein the associative map is implemented using a hash table.

27. The method of claim 19, wherein the queue is implemented using a heap.

* * * * *